(12) United States Patent
Sanchez et al.

(10) Patent No.: US 11,896,903 B2
(45) Date of Patent: Feb. 13, 2024

(54) SYSTEMS AND METHODS FOR GENERATING VIRTUAL EXPERIENCES FOR A VIRTUAL GAME

(71) Applicant: BlueOwl, LLC, San Francisco, CA (US)

(72) Inventors: Kenneth Jason Sanchez, San Francisco, CA (US); Micah Wind Russo, Oakland, CA (US)

(73) Assignee: BLUEOWL, LLC, San Francisco, CA (US)

( * ) Notice: Subject to any disclaimer, the term of this patent is extended or adjusted under 35 U.S.C. 154(b) by 79 days.

(21) Appl. No.: 17/404,144

(22) Filed: Aug. 17, 2021

(65) Prior Publication Data
US 2023/0347249 A1 Nov. 2, 2023

(51) Int. Cl.
*A63F 13/803* (2014.01)
*A63F 13/65* (2014.01)
(Continued)

(52) U.S. Cl.
CPC .............. *A63F 13/58* (2014.09); *A63F 13/65* (2014.09); *A63F 13/803* (2014.09); *G09B 9/052* (2013.01)

(58) Field of Classification Search
CPC ......... A63F 13/65; A63F 13/803; G09B 9/02; G09B 9/042; G09B 9/04; G09B 9/052
See application file for complete search history.

(56) References Cited

U.S. PATENT DOCUMENTS 6,726,567 B1 * 4/2004 Khosla ................... A63F 13/65
463/42
7,278,920 B1 10/2007 Klamer et al.
(Continued)

FOREIGN PATENT DOCUMENTS

CN 105718065 A 6/2016
CN 107543554 A 1/2018
(Continued)

OTHER PUBLICATIONS

Quinn, Nathan, "F1 2021 Driver Ratings Unveiled as Verstappen Equals Hamilton," Jul. 8, 2021, available at https://the-race.com/gaming/f1-2021-driver-ratings-unveiled-as-verstappen-equals-hamilton/ (Year: 2021).*

(Continued)

*Primary Examiner* — Jay Trent Liddle
(74) *Attorney, Agent, or Firm* — BRYAN CAVE LEIGHTON PAISNER LLP

(57) ABSTRACT

Method and system for generating virtual experiences. For example, the method includes receiving first real-world telematics data associated with a first real-world user, determining first real-world driving characteristics based upon the first real-world telematics data, generating first virtual experiences based upon the first real-world driving characteristics, presenting the first virtual experiences in a virtual game, receiving second real-world telematics data associated with a second real-world user, determining second real-world driving characteristics based upon the second real-world telematics data, generating second virtual experiences based upon the second real-world driving characteristics, and presenting the second virtual experiences in the virtual game, where the first virtual experiences are different from the second virtual experiences.

20 Claims, 8 Drawing Sheets

(51) Int. Cl.
*A63F 13/58* (2014.01)
*G09B 9/052* (2006.01)

(56) References Cited

U.S. PATENT DOCUMENTS

| | | | |
|---|---|---|---|
| 8,645,029 B2 | 2/2014 | Kim et al. | |
| 8,799,035 B2 | 8/2014 | Coleman et al. | |
| 9,140,567 B2 | 9/2015 | Fryer et al. | |
| 9,327,189 B2 | 5/2016 | Bavitz et al. | |
| 9,352,216 B2 | 5/2016 | Mullen | |
| 9,373,203 B1 | 6/2016 | Fields et al. | |
| 9,381,426 B1 | 7/2016 | Hughes et al. | |
| 9,473,893 B2 | 10/2016 | Kuramura et al. | |
| 9,478,150 B1 | 10/2016 | Fields et al. | |
| 9,498,704 B1 | 11/2016 | Cohen et al. | |
| 9,586,591 B1 | 3/2017 | Fields et al. | |
| 9,643,089 B2 | 5/2017 | Ishikawa et al. | |
| 9,691,298 B1 | 6/2017 | Hsu-Hoffman et al. | |
| 9,754,425 B1 | 9/2017 | Iqbal et al. | |
| 9,786,170 B2 | 10/2017 | Roy et al. | |
| 9,858,832 B1 | 1/2018 | Hsu-Hoffman et al. | |
| 9,892,573 B1 | 2/2018 | Hsu et al. | |
| 9,916,693 B1 | 3/2018 | Carr et al. | |
| 9,943,754 B2 | 4/2018 | Prasad et al. | |
| 10,013,883 B2 | 7/2018 | Farnham et al. | |
| 10,055,794 B1 | 8/2018 | Konrardy et al. | |
| 10,086,287 B2 | 10/2018 | Krietzman et al. | |
| 10,127,570 B1 | 11/2018 | Cote et al. | |
| 10,181,238 B2 | 1/2019 | Hate | |
| 10,262,375 B1 | 4/2019 | Howard | |
| 10,282,786 B1 | 5/2019 | Osborne et al. | |
| 10,282,911 B2 | 5/2019 | Carr et al. | |
| 10,360,576 B1 | 7/2019 | Hsu-Hoffman | |
| 10,369,472 B1 | 8/2019 | Mattar et al. | |
| 10,384,130 B2 | 8/2019 | Parisi | |
| 10,403,043 B2 | 9/2019 | Kaufman et al. | |
| 10,430,745 B2 | 10/2019 | Rani et al. | |
| 10,445,758 B1 | 10/2019 | Bryer et al. | |
| 10,521,983 B1 | 12/2019 | Hsu-Hoffman et al. | |
| 10,557,715 B2 | 2/2020 | Caldas et al. | |
| 10,603,591 B1 | 3/2020 | Navulur | |
| 10,617,938 B2 | 4/2020 | Chen et al. | |
| 10,681,181 B2 | 6/2020 | Hamill | |
| 10,703,378 B1 | 7/2020 | Russo et al. | |
| 10,713,543 B1 | 7/2020 | Skuin et al. | |
| 10,723,312 B1 | 7/2020 | Potter et al. | |
| 10,737,184 B2 | 8/2020 | Baszucki | |
| 10,775,179 B1 | 9/2020 | Hayward | |
| 10,782,699 B2 | 9/2020 | Tao et al. | |
| 10,788,332 B2 | 9/2020 | Deluca et al. | |
| 10,831,207 B1 | 11/2020 | Leung et al. | |
| 10,832,593 B1 | 11/2020 | Dahl et al. | |
| 10,885,539 B1 | 1/2021 | Purgatorio et al. | |
| 10,885,592 B2 | 1/2021 | Hsu-Hoffman et al. | |
| 10,915,964 B1 | 2/2021 | Purgatorio et al. | |
| 10,916,075 B1 | 2/2021 | Webster et al. | |
| 11,037,382 B2 | 6/2021 | Lei et al. | |
| 11,504,622 B1 | 11/2022 | Sanchez et al. | |
| 2001/0006908 A1 | 7/2001 | Fujioka et al. | |
| 2002/0028704 A1 | 3/2002 | Bloomfield et al. | |
| 2002/0070916 A1 | 6/2002 | Noro et al. | |
| 2002/0075286 A1 | 6/2002 | Yonezawa et al. | |
| 2002/0082068 A1 | 6/2002 | Singhal | |
| 2002/0082082 A1 | 6/2002 | Stamper et al. | |
| 2002/0090985 A1 | 7/2002 | Tochner et al. | |
| 2002/0178033 A1 | 11/2002 | Yoshioka et al. | |
| 2002/0198055 A1 | 12/2002 | Bull et al. | |
| 2003/0062675 A1 | 4/2003 | Noro et al. | |
| 2003/0144047 A1 | 7/2003 | Sprogis | |
| 2003/0224855 A1 | 12/2003 | Cunningham | |
| 2004/0005927 A1 | 1/2004 | Bonilla et al. | |
| 2004/0046655 A1 | 3/2004 | Benes et al. | |
| 2004/0058732 A1 | 3/2004 | Piccionelli | |
| 2004/0224740 A1* | 11/2004 | Ball | A63F 13/65 463/6 |
| 2004/0248653 A1 | 12/2004 | Barros et al. | |
| 2004/0259059 A1 | 12/2004 | Aoki et al. | |
| 2005/0009608 A1 | 1/2005 | Robarts et al. | |
| 2005/0049022 A1 | 3/2005 | Mullen | |
| 2005/0114102 A1 | 5/2005 | Gilbert et al. | |
| 2006/0105838 A1 | 5/2006 | Mullen | |
| 2006/0154710 A1 | 7/2006 | Serafat | |
| 2006/0257832 A1 | 11/2006 | Atkins et al. | |
| 2006/0258420 A1 | 11/2006 | Mullen | |
| 2007/0257804 A1 | 11/2007 | Gunderson et al. | |
| 2007/0281765 A1 | 12/2007 | Mullen | |
| 2007/0281766 A1 | 12/2007 | Mullen | |
| 2007/0296723 A1* | 12/2007 | Williams | A63F 13/12 345/473 |
| 2008/0015018 A1 | 1/2008 | Mullen | |
| 2008/0015024 A1 | 1/2008 | Mullen | |
| 2008/0081694 A1 | 4/2008 | Hong et al. | |
| 2008/0280684 A1 | 11/2008 | McBride et al. | |
| 2008/0309675 A1 | 12/2008 | Fleury et al. | |
| 2009/0005140 A1 | 1/2009 | Rose et al. | |
| 2009/0076784 A1* | 3/2009 | Ong | A63F 13/45 706/62 |
| 2010/0205012 A1 | 8/2010 | McClellan | |
| 2010/0227688 A1 | 9/2010 | Lee et al. | |
| 2010/0271367 A1* | 10/2010 | Vaden | G06T 19/006 348/157 |
| 2011/0090075 A1 | 4/2011 | Armitage et al. | |
| 2011/0212766 A1 | 9/2011 | Bowers et al. | |
| 2011/0319148 A1 | 12/2011 | Kinnebrew et al. | |
| 2012/0052953 A1 | 3/2012 | Annambhotla et al. | |
| 2012/0069131 A1 | 3/2012 | Abelow | |
| 2012/0072241 A1 | 3/2012 | Krause et al. | |
| 2012/0142429 A1 | 6/2012 | Muller | |
| 2012/0185282 A1 | 7/2012 | Gore et al. | |
| 2013/0090821 A1 | 4/2013 | Abboud et al. | |
| 2013/0164715 A1 | 6/2013 | Hunt et al. | |
| 2013/0182116 A1* | 7/2013 | Arima | H04N 21/8126 348/157 |
| 2013/0268156 A1 | 10/2013 | Schumann et al. | |
| 2013/0311250 A1 | 11/2013 | Hickethier et al. | |
| 2014/0125678 A1 | 5/2014 | Wang et al. | |
| 2014/0128146 A1 | 5/2014 | Story et al. | |
| 2014/0129130 A1 | 5/2014 | Kuramura et al. | |
| 2014/0180725 A1 | 6/2014 | Ton-That et al. | |
| 2014/0195106 A1 | 7/2014 | McQuade et al. | |
| 2014/0195272 A1 | 7/2014 | Sadiq et al. | |
| 2014/0322674 A1 | 10/2014 | Livneh | |
| 2014/0322676 A1 | 10/2014 | Raman | |
| 2014/0347368 A1 | 11/2014 | Kishore et al. | |
| 2014/0364238 A1 | 12/2014 | Koh et al. | |
| 2015/0011315 A1 | 1/2015 | Sofman et al. | |
| 2015/0081404 A1 | 3/2015 | Basir | |
| 2015/0093722 A1 | 4/2015 | Fitzgerald et al. | |
| 2015/0112504 A1 | 4/2015 | Binion et al. | |
| 2015/0112540 A1 | 4/2015 | Rutkowski et al. | |
| 2015/0120408 A1 | 4/2015 | Liu et al. | |
| 2015/0178998 A1 | 6/2015 | Attard et al. | |
| 2015/0187224 A1 | 7/2015 | Moncrief et al. | |
| 2015/0212722 A1 | 7/2015 | Leung et al. | |
| 2015/0294422 A1 | 10/2015 | Carver et al. | |
| 2015/0310758 A1 | 10/2015 | Daddona et al. | |
| 2016/0003636 A1 | 1/2016 | Ng-Thow-Hing et al. | |
| 2016/0003836 A1 | 1/2016 | Stauber et al. | |
| 2016/0084661 A1 | 3/2016 | Gautama et al. | |
| 2016/0219024 A1 | 7/2016 | Verzun et al. | |
| 2016/0371553 A1 | 12/2016 | Farnham et al. | |
| 2017/0061733 A1 | 3/2017 | Gulla et al. | |
| 2017/0089710 A1 | 3/2017 | Slusar | |
| 2017/0259177 A1 | 9/2017 | Aghdaie et al. | |
| 2017/0323244 A1 | 11/2017 | Rani et al. | |
| 2018/0060970 A1 | 3/2018 | Oduor et al. | |
| 2018/0247558 A1 | 8/2018 | Livneh | |
| 2018/0286268 A1 | 10/2018 | Ni | |
| 2018/0322700 A1 | 11/2018 | Carr et al. | |
| 2018/0350144 A1 | 12/2018 | Rathod | |
| 2019/0096134 A1 | 3/2019 | Amacker et al. | |
| 2019/0108768 A1 | 4/2019 | Mohamed | |
| 2019/0113927 A1 | 4/2019 | England et al. | |
| 2019/0265703 A1 | 8/2019 | Hicok et al. | |

(56) References Cited

U.S. PATENT DOCUMENTS

| | | | |
|---|---|---|---|
| 2019/0384292 | A1 | 12/2019 | Aragon et al. |
| 2020/0013306 | A1 | 1/2020 | McQuade et al. |
| 2020/0050719 | A1 | 2/2020 | Fuerstenberg et al. |
| 2020/0074266 | A1 | 3/2020 | Peake et al. |
| 2020/0104326 | A1 | 4/2020 | Ricci |
| 2020/0139250 | A1 | 5/2020 | Curtis et al. |
| 2020/0151943 | A1 | 5/2020 | Navarrette et al. |
| 2020/0286253 | A1 | 9/2020 | Chilcote-Bacco |
| 2020/0334762 | A1 | 10/2020 | Carver et al. |
| 2020/0357075 | A1 | 11/2020 | Dahl |
| 2020/0391104 | A1 | 12/2020 | Nakamura et al. |
| 2021/0049925 | A1 | 2/2021 | Robinson et al. |
| 2021/0232632 | A1 | 7/2021 | Howard |
| 2021/0346805 | A1* | 11/2021 | Daniali .......... A63F 13/332 |
| 2022/0242450 | A1 | 8/2022 | Sokolov et al. |
| 2022/0284077 | A1 | 9/2022 | Dahl et al. |

FOREIGN PATENT DOCUMENTS

| | | |
|---|---|---|
| CN | 108253982 A | 7/2018 |
| CN | 108334090 A | 7/2018 |
| CN | 108446027 A | 8/2018 |
| CN | 109491394 A | 3/2019 |
| CN | 110427682 A | 11/2019 |
| CN | 210021183 U | 2/2020 |
| DE | 102013213179 A1 | 1/2015 |
| DE | 102018122864 A1 | 3/2020 |
| DE | 102019205083 A1 | 10/2020 |
| JP | 2014-181927 A | 9/2014 |
| KR | 10-2013-0107481 A | 10/2013 |
| KR | 10-2053794 B1 | 12/2019 |
| WO | 2016/148753 A1 | 9/2016 |
| WO | 2019/245578 A1 | 12/2019 |
| WO | 2020/172634 A1 | 8/2020 |
| WO | 2020/181001 A1 | 9/2020 |

OTHER PUBLICATIONS

Ali et al., "Virtual Environment for Automobile Driving Test", In 2018 International Conference on Computing Sciences and Engineering (ICCSE), Mar. 2018, pp. 1-6.

Avouris et al., "A review of mobile location-based games for learning across physical and virtual spaces", J. UCS, vol. 18, No. 15, 2012, pp. 2120-2142.

Bozorgi et al., "A Time and Energy Efficient Routing Algorithm for Electric Vehicles Based on Historical Driving Data", IEEE Transactions on Intelligent Vehicles, vol. 2, No. 4, 2017.

Bui et al., "The Effects of Gamification on Driver Behavior: An Example from a Free Float Carsharing Service", 2015.

Culík et al., "Creating a Virtual Environment for Practical Driving Tests", In International Conference on Transport Systems Telematics, 2019, pp. 95-108.

Dooren et al., "Rewards That Make You Play: the Distinct Effect of Monetary Rewards, Virtual Points and Social Rewards on Play Persistence in Substance Dependent and Non-Dependent Adolescents", In 2018 IEEE 6th International Conference on Serious Games and Applications for Health (SeGAH), May 2018, pp. 1-7.

Esser et al., "Towards learning a realistic rendering of human behavior", In Proceedings of the European Conference on Computer Vision (ECCV), 2018, (pp. 0-0).

Handel et al., "Insurance telematics: Opportunities and challenges with the smartphone solution", IEEE Intelligent Transportation Systems Magazine, vol. 6, No. 4, 2014, pp. 57-70.

Helvaci et al., "Improving Driver Behavior Using Gamication", In International Conference on Mobile Web and Intelligent Information Systems, Aug. 2018, pp. 193-204.

Herrtwich et al., "Cooperative Driving: Taking Telematics to the Next Level", In Traffic and Granular Flow'01, 2003, pp. 271-280.

International Search Report and Written Opinion received for PCT Patent Application No. PCT/US2021/013911, dated Mar. 31, 2021, 9 pages.

International Search Report and Written Opinion received for PCT Patent Application No. PCT/US2021/013918, dated Apr. 8, 2021, 10 pages.

International Search Report and Written Opinion received for PCT Patent Application No. PCT/US2021/013928, dated Apr. 2, 2021, 8 pages.

International Search Report and Written Opinion received for PCT Patent Application No. PCT/US2021/013930, dated Apr. 23, 2021, 12 pages.

Lang et al., "Synthesizing Personalized Training Programs for Improving Driving Habits via Virtual Reality", In 2018 IEEE Conference on Virtual Reality and 3D User Interfaces, Mar. 2018, pp. 297-304.

Liu et al., "Two Techniques for Assessing Virtual Agent Personality", IEEE Transactions on Affective Computing, vol. 7, No. 1, May 19, 2015, pp. 94-105.

Lopez et al., "Using pervasive games as learning tools in educational contexts: a systematic review", International Journal of Learning Technology, vol. 13, No. 2, 2018, pp. 93-114.

Richter et al., "Studying Gamification: The Effect of Rewards and Incentives on Motivation", In Gamification in education and business, 2015, pp. 21-46.

Sha et al., "Social vehicle navigation: integrating shared driving experience into vehicle navigation", In Proceedings of the 14th workshop on mobile computing systems and applications, Feb. 2013, pp. 1-6.

Singh et al., "Real-time Collaboration Between Mixed Reality Users in Geo-referenced Virtual Environment", arXiv preprint arXiv, 2020, 2010.01023.

Stojaspal, Jan., "Gamification and telematics", available online at https://www.tu-auto.com/gamification-and-telematics/, 2013, 6 pages.

Wiki.sc4devotion.com, SimCity 4 Encyclopaedia, "Tutorial: Understanding the Traffic Simulator", pp. 1-15. Retrieved from the Internet on Aug. 14, 2019: https://www.wiki.sc4devotion.com/index.php?title=Understanding_the_Traffic_Simulator.

Wilken et al., "Maps and the Autonomous Vehicle as a Communication Platform", International Journal of Communication, vol. 13, 20'19, pp. 2703-2727.

Vibhor Rastogi (Virtual Reality Based Simulation Testbed for Evaluation of Autonomous Vehicle Behavior Algorithms, Clemson University, 2017, pp. 1-69) (Year: 2017).

"Drive Safe, Score Well: App Is A Driving 'Report Card'," by Lynn Jolicoeur and Sacha Pfeiffer, published Oct. 9, 2014. Source: https://www.wbur.org/news/2014/10/09/safe-driving-app (Year: 2014).

"UK Telematics Online. Submitted articles relating to Vehicle Telematics," published Aug. 31, 2009. Source: https://web.archive.org/web/20090831075032/http://www.uktelematicsonline.co.uk/html/telematics_articles.html (Year: 2009).

* cited by examiner

SYSTEMS AND METHODS FOR GENERATING VIRTUAL EXPERIENCES FOR A VIRTUAL GAME

CROSS-REFERENCE TO RELATED APPLICATIONS

The following six applications, including this one, are being filed concurrently and the other five are hereby incorporated by reference in their entirety for all purposes:
1. U.S. patent application Ser. No. 17/404,139, titled "Systems and Methods for Generating Virtual Characters for a Virtual Game";
2. U.S. patent application Ser. No. 17/404,144, titled "Systems and Methods for Generating Virtual Experiences for a Virtual Game";
3. U.S. patent application Ser. No. 17/404,152, titled "Systems and Methods for Generating Virtual Encounters in Virtual Games";
4. U.S. patent application Ser. No. 17/404,158, titled "Systems and Methods for Generating Virtual Maps in Virtual Games";
5. U.S. patent application Ser. No. 17/404,164, titled "Systems and Methods for Generating Shared Virtual Maps in Virtual Games"; and
6. U.S. patent application Ser. No. 17/404,172, titled "Systems and Methods for Presenting Shared In-Game Objectives in Virtual Games".

FIELD OF THE DISCLOSURE

Some embodiments of the present disclosure are directed to generating virtual experiences in a virtual game. More particularly, certain embodiments of the present disclosure provide methods and systems for generating the virtual experiences using real-world telematics data. Merely by way of example, the present disclosure has been applied to presenting the virtual experiences to enhance vehicle safety awareness for real-world drivers. But it would be recognized that the present disclosure has much broader range of applicability.

BACKGROUND OF THE DISCLOSURE

While individuals generally exercise care while operating vehicles, it is still challenging for many vehicle operators to fully appreciate the risks associated with vehicle operations. As such, many vehicle operators may not be readily mindful of reducing such risks. Hence, it is highly desirable to develop new technologies that can increase a vehicle operator's appreciation and awareness of the risks posed by vehicle operation.

BRIEF SUMMARY OF THE DISCLOSURE

Some embodiments of the present disclosure are directed to generating virtual experiences in a virtual game. More particularly, certain embodiments of the present disclosure provide methods and systems for generating the virtual experiences using real-world telematics data. Merely by way of example, the present disclosure has been applied to presenting the virtual experiences to enhance vehicle safety awareness for real-world drivers. But it would be recognized that the present disclosure has much broader range of applicability.

According to certain embodiments, a method for generating one or more virtual experiences includes receiving first real-world telematics data associated with one or more prior first real-world vehicle trips made by a first real-world user. Also, the method includes determining one or more first real-world driving characteristics based at least in part upon the first real-world telematics data before one or more first virtual experiences are generated. Additionally, the method includes generating the one or more first virtual experiences based at least in part upon the one or more first real-world driving characteristics, where the one or more first virtual experiences are related to a first virtual character associated with the first real-world user. After the one or more first virtual experiences are generated, the method includes presenting the one or more first virtual experiences in a virtual game. Further, the method includes receiving second real-world telematics data associated with one or more prior second real-world vehicle trips made by a second real-world user. Also, the method includes determining one or more second real-world driving characteristics based at least in part upon the second real-world telematics data before one or more second virtual experiences are generated. Additionally, the method includes generating the one or more second virtual experiences based at least in part upon the one or more second real-world driving characteristics, where the one or more second virtual experiences are related to a second virtual character associated with the second real-world user. After the one or more second virtual experiences are generated, the method includes presenting the one or more second virtual experiences in the virtual game. The one or more first real-world driving characteristics and the one or more second real-world driving characteristics are different. The one or more first virtual experiences and the one or more second virtual experiences are generated to be different in response to the one or more first real-world driving characteristics and the one or more second real-world driving characteristics being different.

According to some embodiments, a computing device for generating one or more virtual experiences includes one or more processors and a memory that stores instructions for execution by the one or more processors. The instructions, when executed, cause the one or more processors to receive first real-world telematics data associated with one or more prior first real-world vehicle trips made by a first real-world user. Also, the instructions, when executed, cause the one or more processors to determine one or more first real-world driving characteristics based at least in part upon the first real-world telematics data before one or more first virtual experiences are generated. Additionally, the instructions, when executed, cause the one or more processors to generate the one or more first virtual experiences based at least in part upon the one or more first real-world driving characteristics, where the one or more first virtual experiences are related to a first virtual character associated with the first real-world user. After the one or more first virtual experiences are generated, the instructions, when executed, cause the one or more processors to present the one or more first virtual experiences in a virtual game. Further, the instructions, when executed, cause the one or more processors to receive second real-world telematics data associated with one or more prior second real-world vehicle trips made by a second real-world user. Also, the instructions, when executed, cause the one or more processors to determine one or more second real-world driving characteristics based at least in part upon the second real-world telematics data before one or more second virtual experiences are generated. Additionally, the instructions, when executed, cause the one or more processors to generate the one or more second virtual experiences based at least in part upon the one or more second real-world driving characteristics, where the one or more second virtual experiences are related to a second virtual character associated with the second real-world user. After the one or more second virtual experiences are generated, the instructions, when executed, cause the one or more processors to present the one or more second virtual experiences in the virtual game. The one or more first real-world driving characteristics and the one or more second real-world driving characteristics are different. The one or more first virtual experiences and the one or more second virtual experiences are generated to be different in response to the one or more first real-world driving characteristics and the one or more second real-world driving characteristics being different.

According to certain embodiments, a non-transitory computer-readable medium stores instructions for generating one or more virtual experiences. The instructions are executed by one or more processors of a computing device. The non-transitory computer-readable medium includes instructions to receive first real-world telematics data associated with one or more prior first real-world vehicle trips made by a first real-world user. Also, the non-transitory computer-readable medium includes instructions to determine one or more first real-world driving characteristics based at least in part upon the first real-world telematics data before one or more first virtual experiences are generated. Additionally, the non-transitory computer-readable medium includes instructions to generate the one or more first virtual experiences based at least in part upon the one or more first real-world driving characteristics, where the one or more first virtual experiences are related to a first virtual character associated with the first real-world user. After the one or more first virtual experiences are generated, the non-transitory computer-readable medium includes instructions to present the one or more first virtual experiences in a virtual game. Further, the non-transitory computer-readable medium includes instructions to receive second real-world telematics data associated with one or more prior second real-world vehicle trips made by a second real-world user. Also, the non-transitory computer-readable medium includes instructions to determine one or more second real-world driving characteristics based at least in part upon the second real-world telematics data before one or more second virtual experiences are generated. Additionally, the non-transitory computer-readable medium includes instructions to generate the one or more second virtual experiences based at least in part upon the one or more second real-world driving characteristics, where the one or more second virtual experiences are related to a second virtual character associated with the second real-world user. After the one or more second virtual experiences are generated, the non-transitory computer-readable medium includes instructions to present the one or more second virtual experiences in the virtual game. The one or more first real-world driving characteristics and the one or more second real-world driving characteristics are different. The one or more first virtual experiences and the one or more second virtual experiences are generated to be different in response to the one or more first real-world driving characteristics and the one or more second real-world driving characteristics being different.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to generating virtual experiences in a virtual game. More particularly, certain embodiments of the present disclosure provide methods and systems for generating the virtual experiences using real-world telematics data. Merely by way of example, the present disclosure has been applied to presenting the virtual experiences to enhance vehicle safety awareness for real-world drivers. But it would be recognized that the present disclosure has much broader range of applicability.

I. ONE OR MORE METHODS FOR GENERATING VIRTUAL EXPERIENCES ACCORDING TO CERTAIN EMBODIMENTS

Figure 1:
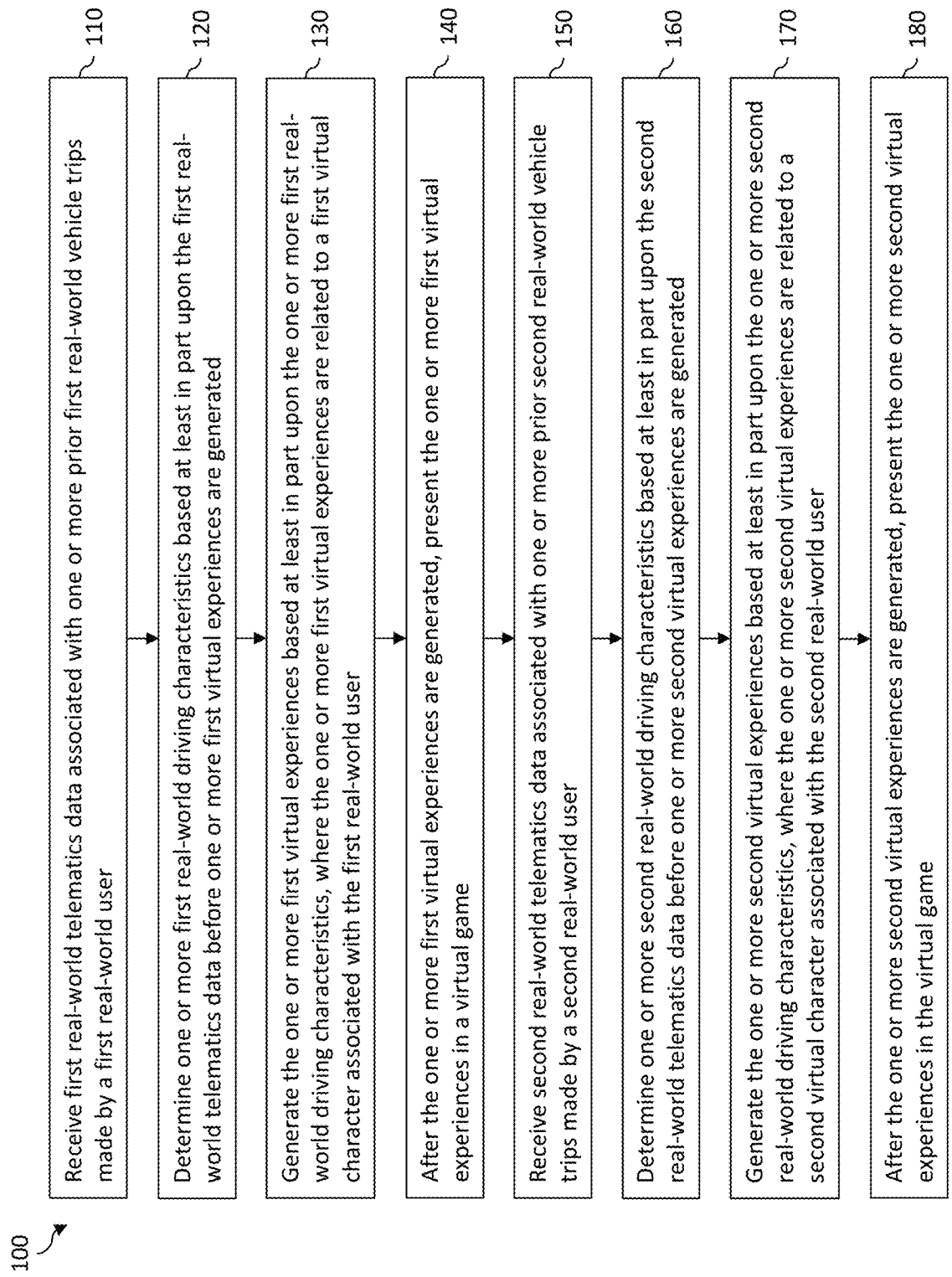
FIG. 1 shows a simplified method for generating virtual experiences according to certain embodiments of the present disclosure.

FIG. 1 shows a simplified method for generating virtual experiences according to certain embodiments of the present disclosure. The figure is merely an example, which should not unduly limit the scope of the claims. One of ordinary skill in the art would recognize many variations, alternatives, and modifications. The method 100 includes process 110 for receiving first real-world telematics data from a first real-world user, process 120 for determining first real-world driving characteristics, process 130 for generating first virtual experiences, process 140 for presenting the first virtual experiences, process 150 for receiving second real-world telematics data from a second real-world user, process 160 for determining second real-world driving characteristics, process 170 for generating second virtual experiences, and process 180 for presenting the second virtual experiences. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 110, the first real-world telematics data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. For example, the one or more prior first real-world vehicle trips include actual vehicle trips made by the first real-world user for any personal and/or business reasons (e.g., commuting to work, grocery shopping, going to a bank, road trips, etc.).

In some embodiments, the first real-world telematics data are collected from one or more sensors associated with the first real-world vehicle operated by the first real-world user. For example, the one or more sensors include any type and number of accelerometers, gyroscopes, magnetometers, barometers, location sensors (e.g., GPS sensors), tilt sensors, yaw rate sensors, speedometers, brake sensors, airbag deployment sensors, windshield wiper sensors, headlight sensors, steering angle sensors, gear position sensors, proximity detectors, throttle sensors, gas tank sensors, battery sensors, and/or any other suitable sensors that measure vehicle state and/or operation. As an example, the first real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, and/or any other suitable sensors that measure vehicle state and/or operation. In certain embodiments, the one or more sensors are part of or located in the first real-world vehicle. For example, the one or more sensors communicate and store sensor data in an electronic control module (ECM) or an engine control unit (ECU) of the first real-world vehicle. In some embodiments, the one or more sensors are part of a computing device (e.g., a mobile device, a smart watch) that is connected to the first real-world vehicle. For example, the computing device is connected to the first real-world vehicle while the first real-world vehicle is in operation. As an example, the computing device is connected to the first real-world vehicle while the first real-world vehicle is stationary.

At the process 120, one or more first real-world driving characteristics are determined based at least in part upon the first real-world telematics data before one or more first virtual experiences are generated according to certain embodiments. In various embodiments, the one or more first real-world driving characteristics indicate how the first real-world user drives, such as how frequently the first real-world user drives, type of maneuvers that the first real-world user makes while driving (e.g., hard cornering, hard braking, sudden acceleration, smooth acceleration, slowing before turning, etc.), types of dangerous driving events (e.g., eating while driving, falling asleep while driving, etc.), types of safe driving events (e.g., maintaining safe following distance, turning on headlights, observing traffic lights, yielding to pedestrians, etc.), etc.

In some embodiments, the one or more first real-world driving characteristics refer to one or more driving skills of the first real-world user. For example, the one or more first real-world driving characteristics include a first braking characteristic, a first steering characteristic, a first speeding characteristic, and/or a first focus characteristic. As an example, the first braking characteristic corresponds to the first real-world user's ability to decelerate the first real-world vehicle upon encountering braking obstacles (e.g., T-junctions, stop signs, pedestrian crossings, etc.). For example, the first steering characteristic corresponds to the first real-world user's ability to steer the first real-world vehicle upon encountering steering obstacles (e.g., potholes, road kills, sharp turns, etc.). As an example, the first speeding characteristic corresponds to the first real-world user's ability to decelerate the first real-world vehicle upon encountering speeding obstacles (e.g., approaching a school zone, entering city limit, etc.). For example, the first focus characteristic corresponds to the first real-world user's ability to maintain or regain focus while operating the first real-world vehicle upon encountering focus obstacles (e.g., using a cell phone while driving).

In certain embodiments, the one or more first real-world driving characteristics include one or more first driving attributes associated with the first real-world user. For example, the one or more first driving attributes may include a first driving alertness (e.g., how attentive is the first real-world user while driving), a first driving reaction time (e.g., how fast can the first real-world user react to a given driving situation), a first driving risk-taking (e.g., how likely is the first real-world user to engage in risky driving behavior), a first driving information processing (e.g., how well can the first real-world user interpret inputs from driving environment), a first driving endurance (e.g., how long can the first real-world user drive without rest), and/or other suitable driving traits attributable to the first real-world user.

At the process 130, the one or more first virtual experiences are generated based at least in part upon the one or more first real-world driving characteristics according to some embodiments. In various embodiments, the one or more first virtual experiences are related to a first virtual character associated with the first real-world user. In certain embodiments, the one or more first virtual experiences include one or more first virtual obstacles to be encountered by the first virtual character in a virtual game.

In various embodiments, the one or more first virtual obstacles are generated based at least in part upon the one or more first real-world driving characteristics. For example, the one or more first virtual obstacles have properties (e.g., shape, size, strength, etc.) that are based at least in part upon the one or more first real-world driving characteristics.

At the process 140, the one or more first virtual experiences are presented in the virtual game after the one or more first virtual experiences are generated according to certain embodiments. For example, the one or more first virtual experiences are presented in a remote display (e.g., in a mobile device of the first real-world user). In various embodiments, the first virtual character exists in the virtual game as a playable character for the first real-world user to control.

In some embodiments, the virtual game simulates a virtual driving environment in which the first virtual character operates a first virtual vehicle. In certain embodiments, the one or more first virtual obstacles in the virtual driving environment may include a first virtual crosswalk, a first virtual pothole, a first virtual speed bump, and/or a first virtual billboard. For example, the first virtual crosswalk may be generated based at least in part upon the first braking characteristic. As an example, the first virtual pothole may be generated based at least in part upon the first steering characteristic. For example, the first virtual speed bump may be generated based at least in part upon the first speeding characteristic. As an example, the first virtual billboard may be generated based at least in part upon the first focus characteristic.

In certain embodiments, the one or more first virtual obstacles are placed at corresponding one or more first virtual locations in the virtual game. For example, the first virtual crosswalk, the first virtual pothole, the first virtual speed bump, and/or the first virtual billboard may be placed at different virtual locations along a first virtual route. In various embodiments, the first real-world user can direct the first virtual character to operate the first virtual vehicle and navigate the one or more first virtual obstacles along the first virtual route.

In some embodiments, the virtual game simulates a virtual battle environment in which the first virtual character fights in a battle. In certain embodiments, the one or more first virtual obstacles in the virtual battle environment may include a first virtual enemy, a first virtual swarm attack, a first virtual bridge crossing, a first virtual secret message, and/or a first virtual mountain pass. For example, the first virtual enemy may be generated based at least in part upon the first driving alertness. As an example, the first virtual swarm attack may be generated based at least in part upon the first driving reaction time. For example, the first virtual bridge crossing may be generated based at least in part upon the first driving risk-taking. As an example, the first virtual secret message may be generated based at least in part upon the first driving information processing. For example, the first virtual mountain pass may be generated based at least in part upon the first driving endurance.

In certain embodiments, the one or more first virtual obstacles are placed at corresponding one or more first virtual locations in the virtual game. For example, the first virtual enemy, the first virtual swarm attack, the first virtual bridge crossing, the first virtual secrete message, and/or the first virtual mountain pass may be placed at different virtual locations throughout a first virtual battleground. In various embodiments, the first real-world user can direct the first virtual character to contest and overcome the one or more first virtual obstacles in the first virtual battleground.

At the process 150, the second real-world telematics data associated with one or more prior second real-world vehicle trips made by the second real-world user are received according to some embodiments. In various embodiments, the second real-world user is a real-world driver of a second real-world vehicle. In certain embodiments, the one or more prior second real-world vehicle trips correspond to actual vehicle trips that the second real-world user has made in the past. For example, the one or more prior second real-world vehicle trips include actual vehicle trips made by the second real-world user for any personal and/or business reasons.

In some embodiments, the second real-world telematics data are collected from one or more sensors associated with the second real-world vehicle operated by the second real-world user. For example, the one or more sensors include any type and number of accelerometers, gyroscopes, magnetometers, barometers, location sensors (e.g., GPS sensors), tilt sensors, yaw rate sensors, speedometers, brake sensors, airbag deployment sensors, windshield wiper sensors, headlight sensors, steering angle sensors, gear position sensors, proximity detectors, throttle sensors, gas tank sensors, battery sensors, and/or any other suitable sensors that measure vehicle state and/or operation. As an example, the second real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, and/or any other suitable sensors that measure vehicle state and/or operation. In certain embodiments, the one or more sensors are part of or located in the second real-world vehicle. For example, the one or more sensors communicate and store sensor data in an ECM or ECU of the second real-world vehicle. In some embodiments, the one or more sensors are part of a computing device that is connected to the second real-world vehicle. For example, the computing device is connected to the second real-world vehicle while the second real-world vehicle is in operation. As an example, the computing device is connected to the second real-world vehicle while the second real-world vehicle is stationary.

At the process 160, one or more second real-world driving characteristics are determined based at least in part upon the second real-world telematics data before one or more second virtual experiences are generated according to certain embodiments. In various embodiments, the one or more second real-world driving characteristics indicate how the second real-world user drives, such as how frequently the second real-world user drives, type of maneuvers that the second real-world user makes while driving, types of safe and/or dangerous driving events, etc.

In some embodiments, the one or more second real-world driving characteristics refer to one or more driving skills of the second real-world user. For example, the one or more second real-world driving characteristics include a second braking characteristic, a second steering characteristic, a second speeding characteristic, and/or a second focus characteristic. As an example, the second braking characteristic corresponds to the second real-world user's ability to decelerate the second real-world vehicle upon encountering braking obstacles. For example, the second steering characteristic corresponds to the second real-world user's ability to steer the second real-world vehicle upon encountering steering obstacles. As an example, the second speeding characteristic corresponds to the second real-world user's ability to decelerate the second real-world vehicle upon encountering speeding obstacles. For example, the second focus characteristic corresponds to the second real-world user's ability to maintain or regain focus while operating the second real-world vehicle upon encountering focus obstacles.

In certain embodiments, the one or more second real-world driving characteristics include one or more second driving attributes associated with the second real-world user. For example, the one or more second driving attributes may include a second driving alertness (e.g., how attentive is the second real-world user while driving), a second driving reaction time (e.g., how fast can the second real-world user react to a given driving situation), a second driving risk-taking (e.g., how likely is the second real-world user to engage in risky driving behavior), a second driving information processing (e.g., how well can the second real-world user interpret inputs from driving environment), a second driving endurance (e.g., how long can the second real-world user drive without rest), and/or other suitable driving traits attributable to the second real-world user.

According to various embodiments, the one or more second real-world driving characteristics are different from the one or more first real-world driving characteristics. For example, the first real-world user may be an experienced driver with many years of driving experience, while the second real-world user may be a novice driver with only a few months of driving experience. As an example, the first real-world user will have more developed braking and/or steering skills when compared to the second real-world user. For example, the first real-world user may be an adult driver who does not engage in cell phone usage during vehicle operation, while the second real-world driver may be a teenage driver who is frequently distracted by cell phone usage while driving. As an example, the first real-world user can maintain better attention or alertness while driving when compared to the second real-world user. For example, the first real-world user is a more careful driver than the second real-world user. As an example, the first real-world user tends to slow down more when driving through residential streets when compared to the second real-world user.

At the process 170, the one or more second virtual experiences are generated based at least in part upon the one or more second real-world driving characteristics according to some embodiments. In various embodiments, the one or more second virtual experiences are related to a second virtual character associated with the second real-world user. In certain embodiments, the one or more second virtual experiences include one or more second virtual obstacles to be encountered by the second virtual character in the virtual game.

In various embodiments, the one or more second virtual obstacles are generated based at least in part upon the one or more second real-world driving characteristics. For example, the one or more second virtual obstacles have properties (e.g., shape, size, strength, etc.) that are based at least in part upon the one or more second real-world driving characteristics.

According to various embodiments, the one or more second virtual experiences are generated to be different from the one or more first virtual experiences in response to the one or more second real-world driving characteristics being different from the one or more first real-world driving characteristics. For example, the one or more first virtual obstacles are different from the one or more second virtual obstacles.

At the process 180, the one or more second virtual experiences are presented in the virtual game after the one or more second virtual experiences are generated according to certain embodiments. For example, the one or more second virtual experiences are presented in a remote display (e.g., in a mobile device of the second real-world user). In various embodiments, the second virtual character exists in the virtual game as a playable character for the second real-world user to control.

In some embodiments where the virtual game simulates the virtual driving environment, the second virtual character operates a second virtual vehicle. In certain embodiments, the one or more second virtual obstacles in the virtual driving environment may include a second virtual crosswalk, a second virtual pothole, a second virtual speed bump, and/or a second virtual billboard. For example, the second virtual crosswalk may be generated based at least in part upon the second braking characteristic. As an example, the second virtual pothole may be generated based at least in part upon the second steering characteristic. For example, the second virtual speed bump may be generated based at least in part upon the second speeding characteristic. As an example, the second virtual billboard may be generated based at least in part upon the second focus characteristic.

In certain embodiments, the one or more second virtual obstacles are placed at corresponding one or more second virtual locations in the virtual game. For example, the second virtual crosswalk, the second virtual pothole, the second virtual speed bump, and/or the second virtual billboard may be placed at different virtual locations along a second virtual route. In various embodiments, the second real-world user can direct the second virtual character to operate the second virtual vehicle and navigate the one or more second virtual obstacles along the second virtual route. In certain embodiments, the corresponding one or more first virtual locations are different from the corresponding one or more second virtual locations.

In some embodiments where the virtual game simulates the virtual battle environment, the second virtual character fights in the battle. In certain embodiments, the one or more second virtual obstacles in the virtual battle environment may include a second virtual enemy, a second virtual swarm attack, a second virtual bridge crossing, a second virtual secret message, and/or a second virtual mountain pass. For example, the second virtual enemy may be generated based at least in part upon the second driving alertness. As an example, the second virtual swarm attack may be generated based at least in part upon the second driving reaction time. For example, the second virtual bridge crossing may be generated based at least in part upon the second driving risk-taking. As an example, the second virtual secret message may be generated based at least in part upon the second driving information processing. For example, the second virtual mountain pass may be generated based at least in part upon the second driving endurance.

In certain embodiments, the one or more second virtual obstacles are placed at corresponding one or more second virtual locations in the virtual game. For example, the second virtual enemy, the second virtual swarm attack, the second virtual bridge crossing, the second virtual secrete message, and/or the second virtual mountain pass may be placed at different virtual locations throughout a second virtual battleground. In various embodiments, the second real-world user can direct the second virtual character to contest and overcome the one or more second virtual obstacles in the second virtual battleground. In some examples, the first virtual battleground is the same as the second virtual battleground in the virtual game. In certain examples, the first virtual battleground is different from the second virtual battleground in the virtual game.

According to various embodiments, the one or more first virtual experiences and the one or more second virtual experiences may be updated when new telematics data are received. In some embodiments, third real-world telematics data associated with one or more third real-world vehicle trips made by the first real-world user are received. For example, the one or more third real-world vehicle trips correspond to actual vehicle trips made currently by the first real-world user and/or other vehicle trips made by the first real-world user. In certain embodiments, the one or more first virtual experiences are updated based at least in part upon the third real-world telematics data. For example, the one or more first virtual obstacles may be updated based at least in part upon the third real-world telematics data. As an example, the corresponding one or more first virtual locations may be updated based at least in part upon the third real-world telematics data.

In some embodiments, fourth real-world telematics data associated with one or more fourth real-world vehicle trips made by the second real-world user are received. For example, the one or more fourth real-world vehicle trips correspond to actual vehicle trips made currently by the second real-world user and/or other vehicle trips made by the second real-world user. In certain embodiments, the one or more second virtual experiences are updated based at least in part upon the fourth real-world telematics data. For example, the one or more second virtual obstacles may be updated based at least in part upon the fourth real-world telematics data. As an example, the corresponding one or more second virtual locations may be updated based at least in part upon the fourth real-world telematics data.

As discussed above and further emphasized here, FIG. 1 is merely an example, which should not unduly limit the scope of the claims. One of ordinary skill in the art would recognize many variations, alternatives, and modifications. In some examples, at the process 110, in addition to the first real-world telematics data, data from video or photographic capturing devices are also received. For example, the video or photographic capturing devices may be utilized to capture images internally or externally to the first real-world vehicle to determine the one or more first real-world driving characteristics and/or conditions surrounding the first real-world vehicle. In certain examples, at the process 150, in addition to the second real-world telematics data, data from video or photographic capturing devices are also received. For example, the video or photographic capturing devices may be utilized to capture images internally or externally to the second real-world vehicle to determine the one or more second real-world driving characteristics and/or conditions surrounding the second real-world vehicle. In some examples, at the process 140, the one or more first virtual experiences are generated and presented in the virtual game. In certain examples, at the process 180, the one or more second virtual experiences are generated and presented in the virtual game.

Figure 2A:
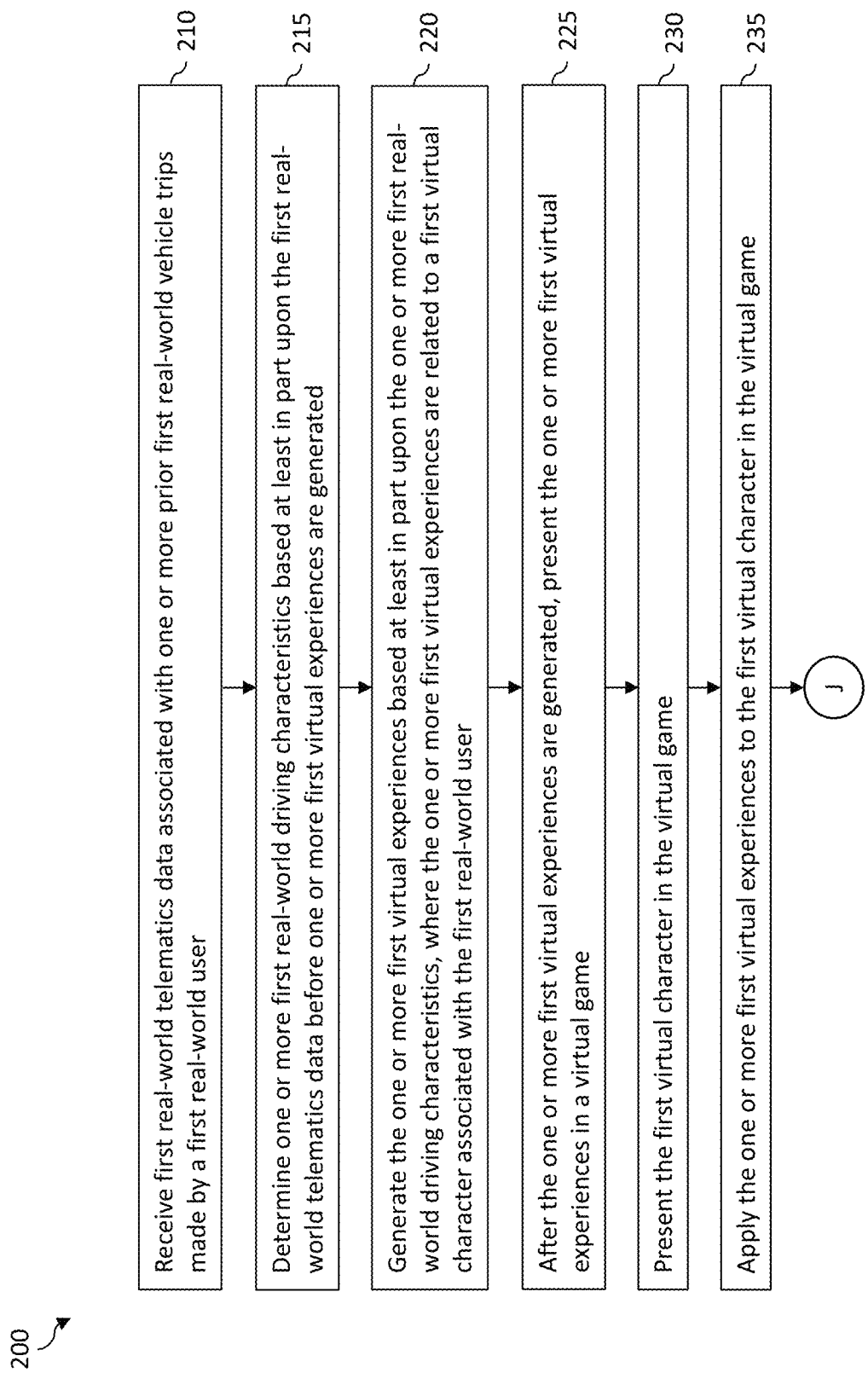
FIG. 2A and FIG. 2B shows a simplified method for generating virtual experiences according to some embodiments of the present disclosure.
Figure 2B:
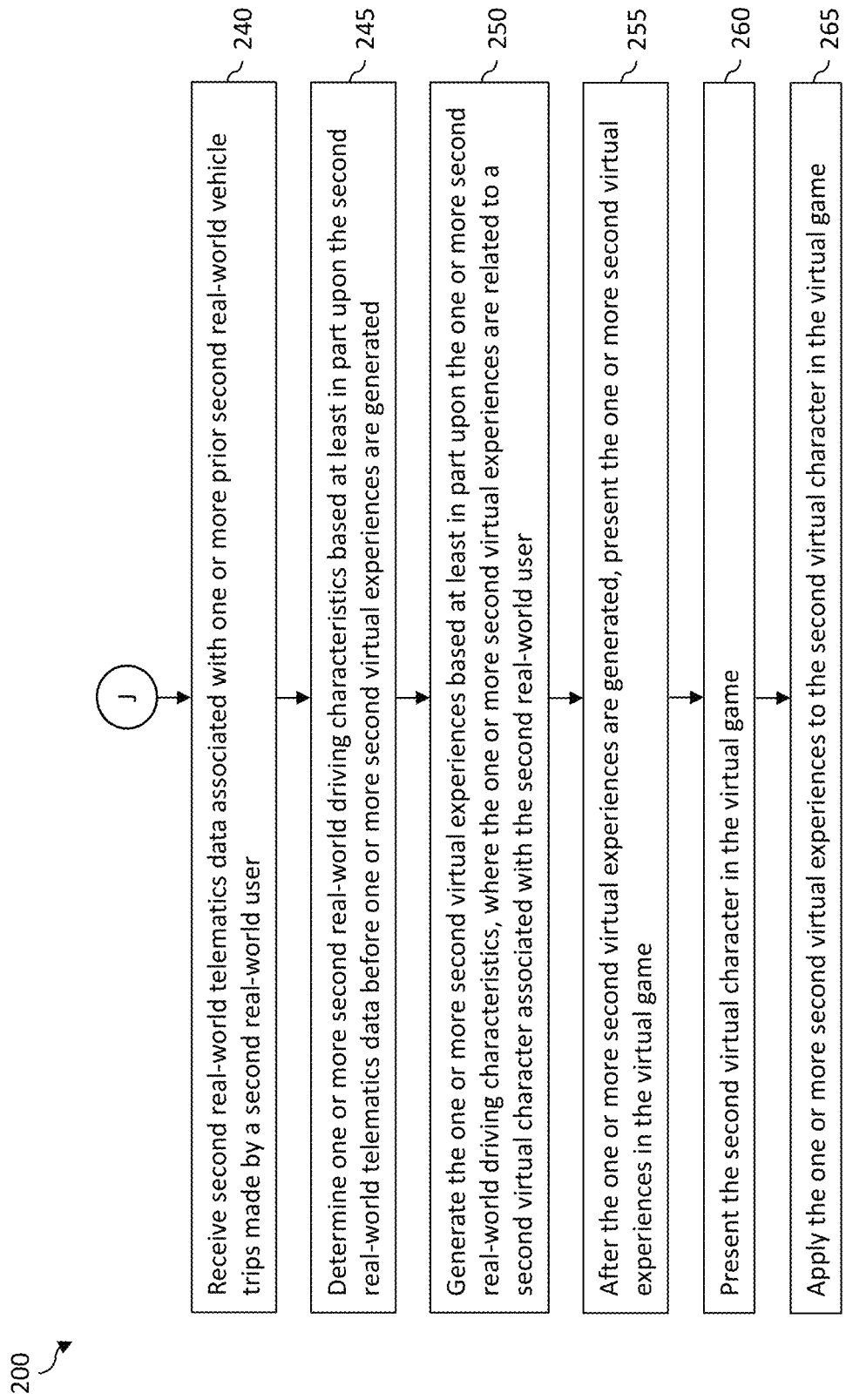

FIG. 2A and FIG. 2B show a simplified method for generating virtual experiences according to some embodiments of the present disclosure. The figures are merely examples, which should not unduly limit the scope of the claims. One of ordinary skill in the art would recognize many variations, alternatives, and modifications. The method 200 includes process 210 for receiving first real-world telematics data from a first real-world user, process 215 for determining first real-world driving characteristics, process 220 for generating first virtual experiences, process 225 for presenting the first virtual experiences, process 230 for presenting a first virtual character, process 235 for applying the first virtual experiences to the first virtual character, process 240 for receiving second real-world telematics data from a second real-world user, process 245 for determining second real-world driving characteristics, process 250 for generating second virtual experiences, process 255 for presenting the second virtual experiences, process 260 for presenting a second virtual character, and process 265 for applying the second virtual experiences to the second virtual character. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 210, the first real-world telematics data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. In some embodiments, the first real-world telematics data are collected from one or more sensors (e.g., accelerometers, gyroscopes, GPS sensors, magnetometers, gas tank sensors, battery sensors, etc.) associated with the first real-world vehicle operated by the first real-world user.

At the process 215, one or more first real-world driving characteristics are determined based at least in part upon the first real-world telematics data before one or more first virtual experiences are generated according to certain embodiments. In various embodiments, the one or more first real-world driving characteristics indicate how the first real-world user drives.

At the process 220, the one or more first virtual experiences are generated based at least in part upon the one or more first real-world driving characteristics according to some embodiments. In various embodiments, the one or more first virtual experiences are related to a first virtual character associated with the first real-world user. In certain embodiments, the one or more first virtual experiences include one or more first virtual obstacles to be encountered by the first virtual character in a virtual game. In some embodiments, the one or more first virtual obstacles are generated based at least in part upon the one or more first real-world driving characteristics. In certain embodiments, the one or more first virtual obstacles are placed at corresponding one or more first virtual locations in the virtual game.

At the process 225, the one or more first virtual experiences are presented in the virtual game after the one or more first virtual experiences are generated according to certain embodiments. At the process 230, the first virtual character is presented in the virtual game according to some embodiments. In certain embodiments, the first virtual character exists in the virtual game as a playable character for the first real-world user to control.

At the process 235, the one or more first virtual experiences are applied to the first virtual character in the virtual game according to some embodiments. In some embodiments, the virtual game simulates a virtual driving environment in which the first virtual character operates a first virtual vehicle. In certain embodiments, applying the one or more first virtual experiences to the first virtual character includes allowing the first virtual character to interact with the one or more first virtual obstacles. For example, the first real-world user can control the first virtual character to navigate the one or more first virtual obstacles placed along a first virtual route in the first virtual vehicle.

In certain embodiments, the virtual game simulates a virtual role-playing environment in which the first virtual character engages in a quest to accomplish a first virtual mission. In certain embodiments, applying the one or more first virtual experiences to the first virtual character includes allowing the first virtual character to interact with the one or more first virtual obstacles. For example, the first real-world user can control the first virtual character to overcome or defeat the one or more first virtual obstacles in order to accomplish the first virtual mission.

At the process 240, the second real-world telematics data associated with one or more prior second real-world vehicle trips made by the second real-world user are received according to some embodiments. In various embodiments, the second real-world user is a real-world driver of a second real-world vehicle. In certain embodiments, the one or more prior second real-world vehicle trips correspond to actual vehicle trips that the second real-world user has made in the past. In some embodiments, the second real-world telematics data are collected from one or more sensors (e.g., accelerometers, gyroscopes, GPS sensors, magnetometers, gas tank sensors, battery sensors, etc.) associated with the second real-world vehicle operated by the second real-world user.

At the process 245, one or more second real-world driving characteristics are determined based at least in part upon the second real-world telematics data before one or more second virtual experiences are generated according to certain embodiments. In various embodiments, the one or more second real-world driving characteristics indicate how the second real-world user drives.

At the process 250, the one or more second virtual experiences are generated based at least in part upon the one or more second real-world driving characteristics according to some embodiments. In various embodiments, the one or more second virtual experiences are related to a second virtual character associated with the second real-world user. In certain embodiments, the one or more second virtual experiences include one or more second virtual obstacles to be encountered by the second virtual character in the virtual game. In some embodiments, the one or more second virtual obstacles are generated based at least in part upon the one or more second real-world driving characteristics. In certain embodiments, the one or more second virtual obstacles are placed at corresponding one or more second virtual locations in the virtual game.

In some embodiments, the one or more second virtual obstacles are generated to be different from the one or more first virtual obstacles in response to the one or more second real-world driving characteristics being different from the one or more first real-world driving characteristics. In certain embodiments, the corresponding one or more second virtual locations are different from the corresponding one or more first virtual locations in response to the one or more second real-world driving characteristics being different from the one or more first real-world driving characteristics.

At the process 255, the one or more second virtual experiences are presented in the virtual game after the one or more second virtual experiences are generated according to certain embodiments. At the process 260, the second virtual character is presented in the virtual game according to some embodiments. In certain embodiments, the second virtual character exists in the virtual game as a playable character for the second real-world user to control.

At the process 265, the one or more second virtual experiences are applied to the second virtual character in the virtual game according to some embodiments. In certain embodiments where the virtual game simulates the virtual driving environment, the second virtual character operates a second virtual vehicle. In some embodiments, applying the one or more second virtual experiences to the second virtual character includes allowing the second virtual character to interact with the one or more second virtual obstacles. For example, the second real-world user can control the second virtual character to navigate the one or more second virtual obstacles placed along a second virtual route in the second virtual vehicle. In some examples, the first virtual route is different from the second virtual route. In certain examples, the first virtual route is the same as the second virtual route.

In certain embodiments where the virtual game simulates the virtual role-playing environment, the second virtual character engages in a quest to accomplish a second virtual mission. In some embodiments, applying the one or more second virtual experiences to the second virtual character includes allowing the second virtual character to interact with the one or more second virtual obstacles. For example, the second real-world user can control the second virtual character to overcome or defeat the one or more second virtual obstacles in order to accomplish the second virtual mission. In some examples, the first virtual mission is different from the second virtual mission. In certain examples, the first virtual mission is the same as the second virtual mission.

As discussed above and further emphasized here, FIG. 2A and FIG. 2B are merely examples, which should not unduly limit the scope of the claims. One of ordinary skill in the art would recognize many variations, alternatives, and modifications. In some examples, at the process 225, the one or more first virtual experiences are generated and presented in the virtual game. In certain examples, at the process 255, the one or more second virtual experiences are generated and presented in the virtual game.

Figure 3A:
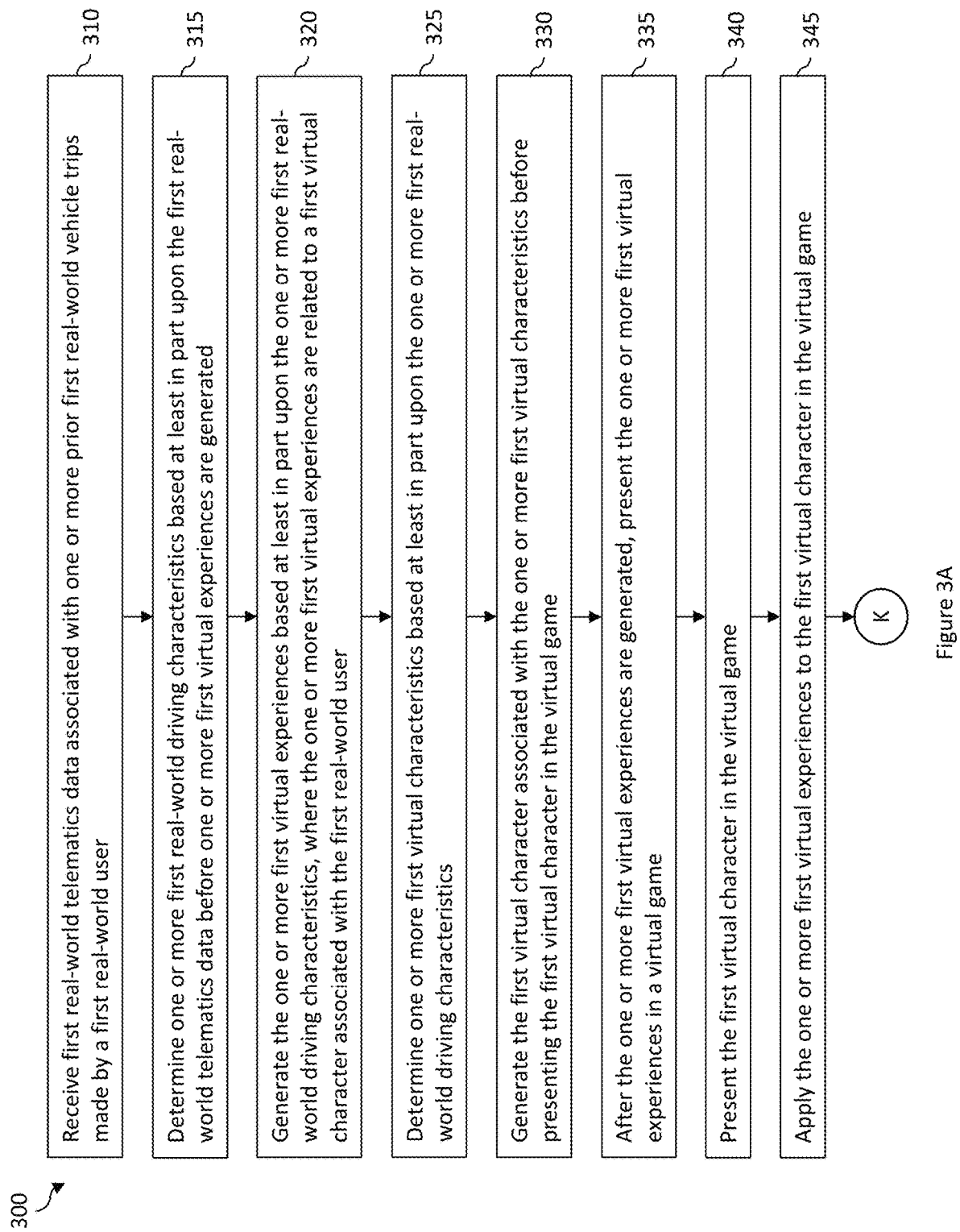
FIG. 3A and FIG. 3B shows a simplified method for generating virtual experiences and virtual characters according to certain embodiments of the present disclosure.
Figure 3B:
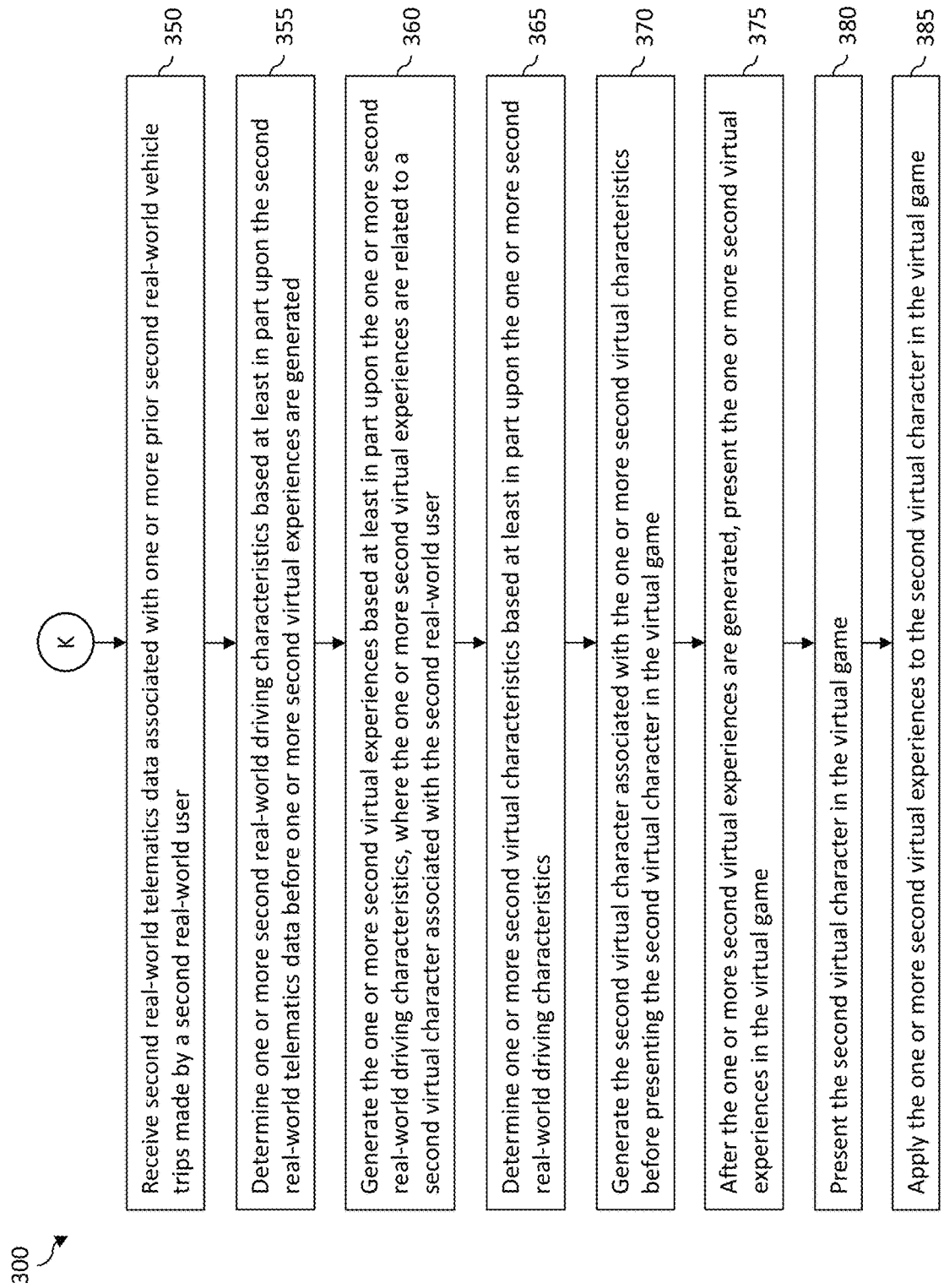

FIG. 3A and FIG. 3B show a simplified method for generating virtual experiences and virtual characters according to certain embodiments of the present disclosure. The figures are merely examples, which should not unduly limit the scope of the claims. One of ordinary skill in the art would recognize many variations, alternatives, and modifications. The method 300 includes process 310 for receiving first real-world telematics data from a first real-world user, process 315 for determining first real-world driving characteristics, process 320 for generating first virtual experiences, process 325 for determining first virtual characteristics for a first virtual character, process 330 for generating the first virtual character, process 335 for presenting the first virtual experiences, process 340 for presenting the first virtual character, process 345 for applying the first virtual experiences to the first virtual character, process 350 for receiving second real-world telematics data from a second real-world user, process 355 for determining second real-world driving characteristics, process 360 for generating second virtual experiences, process 365 for determining second virtual characteristics for a second virtual character, process 370 for generating the second virtual character, process 375 for presenting the second virtual experiences, process 380 for presenting the second virtual character, and process 385 for applying the second virtual experiences to the second virtual character. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 310, the first real-world telematics data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. In some embodiments, the first real-world telematics data are collected from one or more sensors (e.g., accelerometers, gyroscopes, GPS sensors, magnetometers, gas tank sensors, battery sensors, etc.) associated with the first real-world vehicle operated by the first real-world user.

At the process 315, one or more first real-world driving characteristics are determined based at least in part upon the first real-world telematics data before one or more first virtual experiences are generated according to certain embodiments. In various embodiments, the one or more first real-world driving characteristics indicate how the first real-world user drives. In some embodiments, the one or more first real-world driving characteristics include a first braking characteristic, a first steering characteristic, a first speeding characteristic, and/or a first focus characteristic. In certain embodiments, the one or more first real-world driving characteristics include a first driving alertness, a first driving reaction time, a first driving risk-taking, a first driving information processing, and/or a first driving endurance.

At the process 320, the one or more first virtual experiences are generated based at least in part upon the one or more first real-world driving characteristics according to some embodiments. In various embodiments, the one or more first virtual experiences are related to a first virtual character associated with the first real-world user. In certain embodiments, the one or more first virtual experiences include one or more first virtual obstacles to be encountered by the first virtual character in a virtual game. In some embodiments, the one or more first virtual obstacles are generated based at least in part upon the one or more first real-world driving characteristics. In certain embodiments, the one or more first virtual obstacles are placed at corresponding one or more first virtual locations in the virtual game.

At the process 325, one or more first virtual characteristics are determined based at least in part upon the one or more first real-world driving characteristics according to certain embodiments. In some embodiments, the one or more first virtual characteristics include a first virtual braking skill based at least in part upon the first braking characteristic, a first virtual steering skill based at least in part upon the first steering characteristic, a first virtual speeding skill based at least in part upon the first speeding characteristic, and/or a first virtual focus skill based at least in part upon the first focus characteristic. In certain embodiments, the one or more first virtual characteristics include a first virtual alertness based at least in part upon the first driving alertness, a first virtual reaction time based at least in part upon the first driving reaction time, a first virtual risk-taking based at least in part upon the first driving risk-taking, a first virtual information processing based at least in part upon the first driving information processing, and/or a first virtual endurance based at least in part upon the first driving endurance.

At the process 330, the first virtual character associated with the one or more first virtual characteristics is generated before presenting the first virtual character in the virtual game according to some embodiments. In various embodiments, the first virtual character is a digital representation (e.g., an avatar) of the first real-world user. For example, the first virtual character possesses the one or more first virtual characteristics, such as the first virtual braking skill, the first virtual steering skill, the first virtual speeding skill and/or the first virtual focus skill. As an example, the first virtual character is endowed with the one or more first virtual characteristics, such as the first virtual alertness, the first virtual reaction time, the first virtual risk-taking, the first virtual information processing, and/or the first virtual endurance.

At the process 335, the one or more first virtual experiences are presented in the virtual game after the one or more first virtual experiences are generated according to certain embodiments. At the process 340, the first virtual character is presented in the virtual game according to some embodiments. In certain embodiments, the first virtual character exists in the virtual game as a playable character for the first real-world user to control.

At the process 345, the one or more first virtual experiences are applied to the first virtual character in the virtual game according to some embodiments. In certain embodiments, the first virtual character operates a first virtual vehicle in a virtual driving environment simulated by the virtual game. In some embodiments, applying the one or more first virtual experiences to the first virtual character includes allowing the first virtual character to interact with the one or more first virtual obstacles. For example, the first real-world user can control the first virtual character to navigate the one or more first virtual obstacles in the first virtual vehicle along a first virtual route.

In certain embodiments, the first virtual character competes in a virtual battle environment simulated by the virtual game. In some embodiments, applying the one or more first virtual experiences to the first virtual character includes allowing the first virtual character to interact with the one or more first virtual obstacles. For example, the first real-world user can control the first virtual character to fight and overcome the one or more first virtual obstacles.

At the process 350, the second real-world telematics data associated with one or more prior second real-world vehicle trips made by the second real-world user are received according to some embodiments. In various embodiments, the second real-world user is a real-world driver of a second real-world vehicle. In certain embodiments, the one or more prior second real-world vehicle trips correspond to actual vehicle trips that the second real-world user has made in the past. In some embodiments, the second real-world telematics data are collected from one or more sensors (e.g., accelerometers, gyroscopes, GPS sensors, magnetometers, gas tank sensors, battery sensors, etc.) associated with the second real-world vehicle operated by the second real-world user.

At the process 355, one or more second real-world driving characteristics are determined based at least in part upon the second real-world telematics data before one or more second virtual experiences are generated according to certain embodiments. In various embodiments, the one or more second real-world driving characteristics indicate how the second real-world user drives. In some embodiments, the one or more second real-world driving characteristics include a second braking characteristic, a second steering characteristic, a second speeding characteristic, and/or a second focus characteristic. In certain embodiments, the one or more second real-world driving characteristics include a second driving alertness, a second driving reaction time, a second driving risk-taking, a second driving information processing, and/or a second driving endurance.

At the process 360, the one or more second virtual experiences are generated based at least in part upon the one or more second real-world driving characteristics according to some embodiments. In various embodiments, the one or more second virtual experiences are related to a second virtual character associated with the second real-world user. In certain embodiments, the one or more second virtual experiences include one or more second virtual obstacles to be encountered by the second virtual character in the virtual game. In some embodiments, the one or more second virtual obstacles are generated based at least in part upon the one or more second real-world driving characteristics. In certain embodiments, the one or more second virtual obstacles are placed at corresponding one or more second virtual locations in the virtual game.

At the process 365, one or more second virtual characteristics are determined based at least in part upon the one or more second real-world driving characteristics according to certain embodiments. In some embodiments, the one or more second virtual characteristics include a second virtual braking skill based at least in part upon the second braking characteristic, a second virtual steering skill based at least in part upon the second steering characteristic, a second virtual speeding skill based at least in part upon the second speeding characteristic, and/or a second virtual focus skill based at least in part upon the second focus characteristic. In certain embodiments, the one or more second virtual characteristics include a second virtual alertness based at least in part upon the second driving alertness, a second virtual reaction time based at least in part upon the second driving reaction time, a second virtual risk-taking based at least in part upon the second driving risk-taking, a second virtual information processing based at least in part upon the second driving information processing, and/or a second virtual endurance based at least in part upon the second driving endurance.

According to some embodiments, the one or more second virtual characteristics are determined to be different from the one or more first virtual characteristics in response to the one or more second real-world driving characteristics being different from the one or more first driving real-world characteristics. For example, the first virtual braking skill is different from the second virtual braking skill, the first virtual steering skill is different from the second virtual steering skill, the first virtual speeding skill is different from the second virtual speeding skill, and/or the first virtual focus skill is different from the second virtual focus skill. As an example, the first virtual alertness is different from the second virtual alertness, the first virtual reaction time is different from the second virtual reaction time, the first virtual risk-taking is different from the second virtual risk-taking, the first virtual information processing is different from the second virtual risk-taking, and/or the first virtual endurance is different from the second virtual endurance.

In certain embodiments, the first and second virtual characteristics are different because the first and second virtual characteristics are assigned with different scores to indicate different levels of competency. For example, the first braking characteristic of the first real-world user may be more developed than the second braking characteristic of the second real-world user due to more frequent driving on the part of the first real-world user. As an example, the first virtual braking skill may be assigned a higher score than the second virtual braking skill. For example, the first virtual braking skill is assigned a score of 100 out of 100 while the second virtual braking skill is assigned a score of 60 out of 100. As an example, the first driving reaction time of the first real-world user may be more than the second driving reaction time of the second real-world user because the first real-world user has less years of driving experience. As an example, the first virtual reaction time may be assigned a lower score than the second virtual reaction time.

In some embodiments, the first and second virtual characteristics are different because the first and second virtual characteristics are weighted differently due to other factors. For example, the first real-world user may have zero speeding violations while the second real-world user may have multiple speeding violations. As an example, the first speeding characteristic of the first real-world user may be weighted with a value different from the second speeding characteristic of the second real-world user. For example, the first virtual speeding skill may be weighted with a higher value than the second virtual speeding skill.

In certain embodiments, the first and second virtual characteristics are different because some of the first and/or second virtual characteristics may not exist. For example, there may not be any information in the first real-world telematics data to determine the first driving information processing of the first real-world user, while there is information in the second real-world telematics data to determine the second driving information processing of the second real-world user. As an example, when compared, the first virtual information processing will be missing while the second virtual information processing will be present.

According to some embodiments, the one or more second virtual characteristics are determined to be the same as the one or more first virtual characteristics in response to the one or more second real-world driving characteristics being the same as the one or more first driving real-world characteristics. For example, the first real-world user and the second real-world user share similar real-world driving characteristics. As an example, the first virtual steering skill is the same as the second virtual steering skill, the first virtual braking skill is the same as the second virtual braking skill, the first virtual speeding skill is the same as the second virtual speeding skill, and/or the first virtual focus skill is the same as the second virtual focus skill. For example, the first virtual alertness is the same as the second virtual alertness, the first virtual reaction time is the same as the second virtual reaction time, the first virtual risk-taking is the same as the second virtual risk-taking, the first virtual information processing is the same as the second virtual risk-taking, and/or the first virtual endurance is the same as the second virtual endurance.

At the process 370, the second virtual character associated with the one or more second virtual characteristics is generated before presenting the second virtual character in the virtual game according to some embodiments. In various embodiments, the second virtual character is a digital representation of the second real-world user. For example, the second virtual character possesses the one or more second virtual characteristics, such as the second virtual braking skill, the second virtual steering skill, the second virtual speeding skill and/or the second virtual focus skill. As an example, the second virtual character is endowed with the one or more second virtual characteristics, such as the second virtual alertness, the second virtual reaction time, the second virtual risk-taking, the second virtual information processing, and/or the second virtual endurance. According to various embodiments, the first virtual character and the second virtual character are generated to be different with different virtual characteristics.

At the process 375, the one or more second virtual experiences are presented in the virtual game after the one or more second virtual experiences are generated according to certain embodiments. At the process 380, the second virtual character is presented in the virtual game according to some embodiments. In certain embodiments, the second virtual character exists in the virtual game as a playable character for the second real-world user to control.

At the process 385, the one or more second virtual experiences are applied to the second virtual character in the virtual game according to some embodiments. In certain embodiments, the second virtual character operates a second virtual vehicle in the virtual driving environment simulated by the virtual game. In some embodiments, applying the one or more second virtual experiences to the second virtual character includes allowing the second virtual character to interact with the one or more second virtual obstacles. For example, the second real-world user can control the second virtual character to navigate the one or more second virtual obstacles in the second virtual vehicle along a second virtual route. In some examples, the first virtual route and the second virtual route are the same. In certain examples, the first virtual route is different from the second virtual route.

In some embodiments, the second virtual character competes in the virtual battle environment simulated by the virtual game. In certain embodiments, applying the one or more second virtual experiences to the second virtual character includes allowing the second virtual character to interact with the one or more second virtual obstacles. For example, the second real-world user can control the second virtual character to fight and overcome the one or more second virtual obstacles.

In certain embodiments, the one or more first virtual experiences and the first virtual character are presented in the same virtual game as the one or more second virtual experiences and the second virtual character. In some embodiments, the one or more first virtual experiences and the first virtual character are presented in a different virtual game as the one or more second virtual experiences and the second virtual character. For example, the one or more first virtual experiences and the first virtual character are presented in a first virtual game played by the first real-world user, while the one or more second virtual experiences and the second virtual character are presented in a second virtual game played by the second real-world user.

As discussed above and further emphasized here, FIG. 3A and FIG. 3B are merely examples, which should not unduly limit the scope of the claims. One of ordinary skill in the art would recognize many variations, alternatives, and modifications. In some examples, at the process 335, the one or more first virtual experiences are generated and presented in the virtual game. In certain examples, at the process 375, the one or more second virtual experiences are generated and presented in the virtual game.

Figure 4:
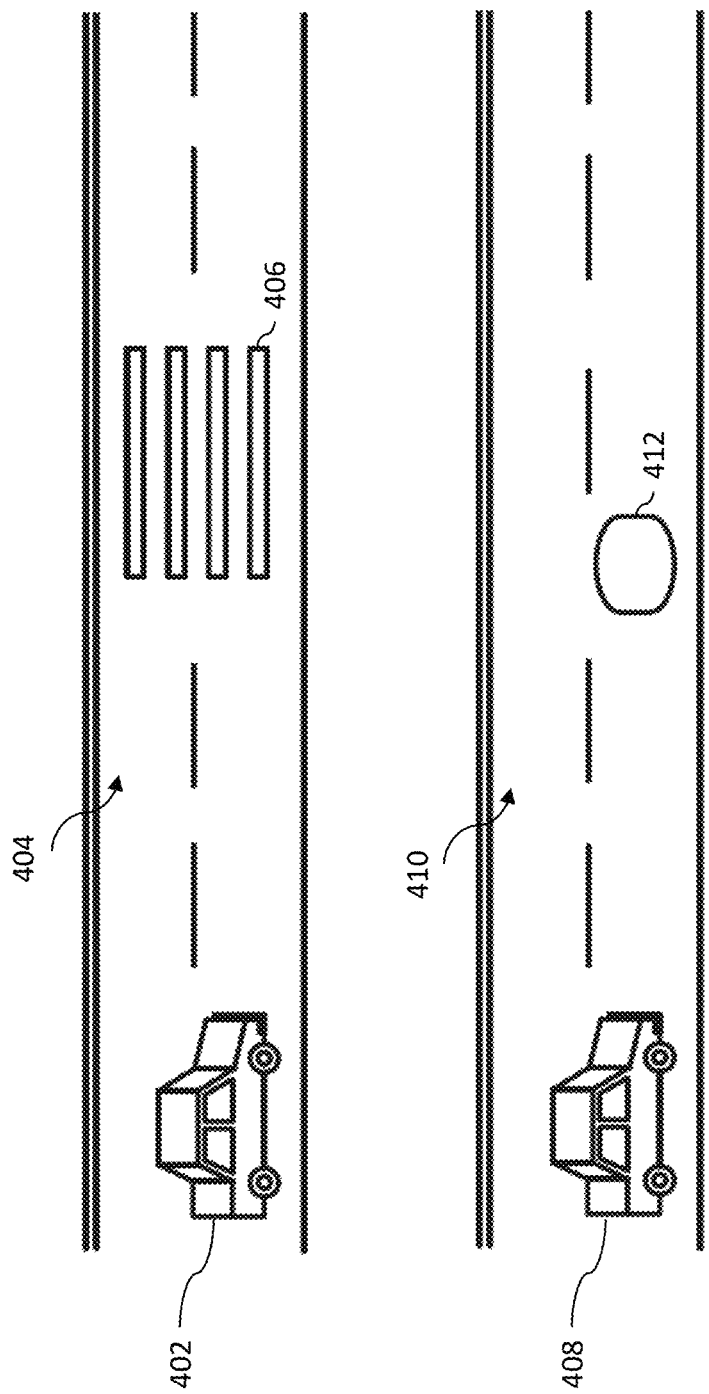
FIG. 4 shows a simplified diagram illustrating virtual experiences according to certain embodiments of the present disclosure.

FIG. 4 shows a simplified diagram illustrating one or more virtual experiences that are generated by the method 100 as shown in FIG. 1A and FIG. 1B, the method 200 as shown in FIG. 2A and FIG. 2B, and/or the method 300 as shown in FIG. 3A and FIG. 3B according to some embodiments of the present disclosure. This figure is merely an example, which should not unduly limit the scope of the claims. One of ordinary skill in the art would recognize many variations, alternatives, and modifications.

In certain embodiments, the one or more first virtual experiences and the one or more second virtual experiences that have been generated by the method 100, the method 200, and/or the method 300 are represented by virtual obstacles. In some embodiments where the virtual driving environment is simulated in the virtual game, the virtual obstacles are applied to virtual characters operating respective virtual vehicles. For example, a virtual vehicle 402 is traveling on a virtual route 404 and a virtual obstacle such as a virtual crosswalk 406 is placed on the virtual route 404. As an example, a virtual vehicle 408 is traveling on a virtual route 410 and a virtual obstacle such as a virtual pothole 412 is placed on the virtual route 410.

II. ONE OR MORE SYSTEMS FOR GENERATING VIRTUAL EXPERIENCES ACCORDING TO CERTAIN EMBODIMENTS

Figure 5:
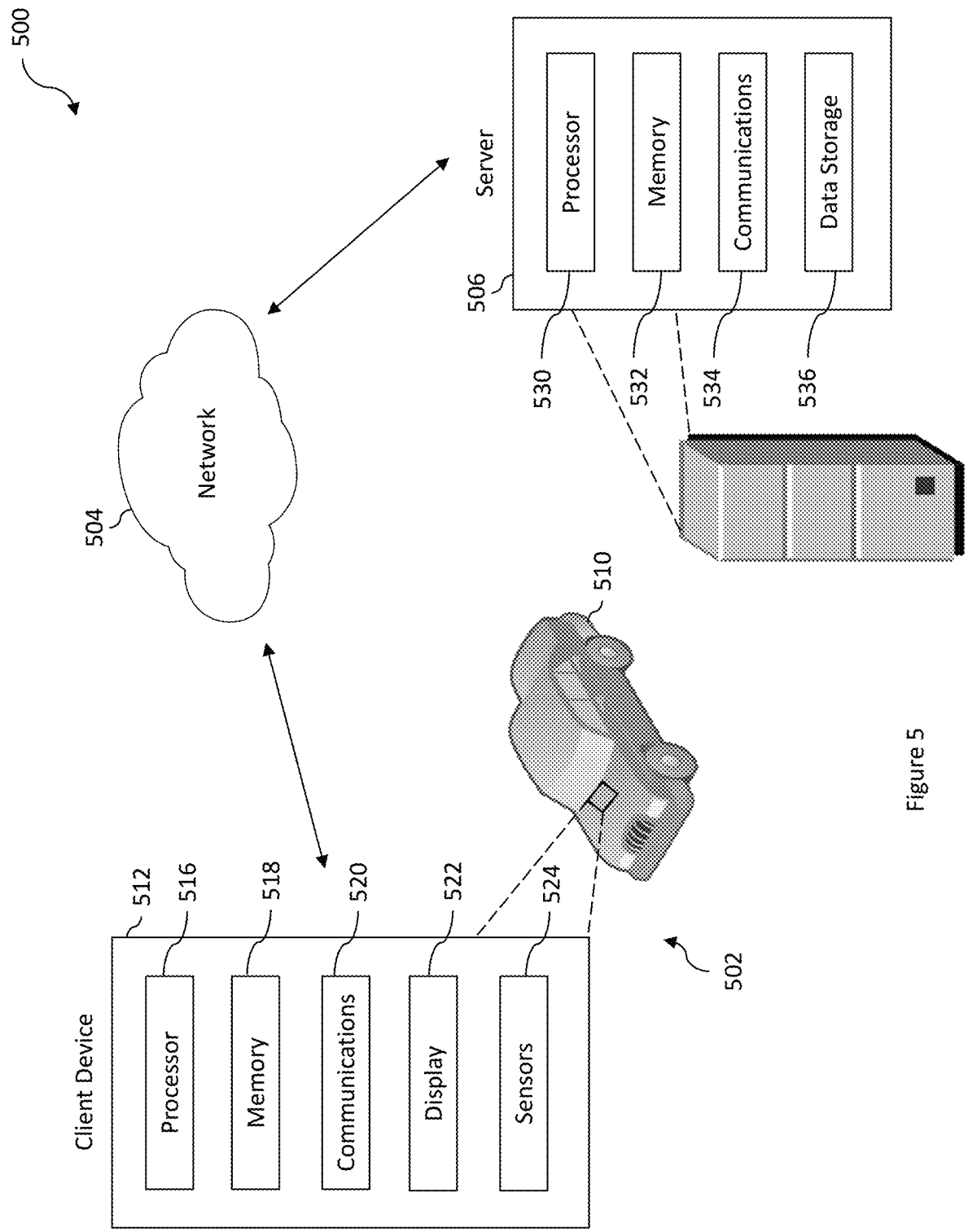
FIG. 5 shows a simplified system for generating virtual experiences according to certain embodiments of the present disclosure.

FIG. 5 shows a simplified system for generating virtual experiences according to certain embodiments of the present disclosure. This figure is merely an example, which should not unduly limit the scope of the claims. One of ordinary skill in the art would recognize many variations, alternatives, and modifications. The system 500 includes a vehicle system 502, a network 504, and a server 506. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 500 is used to implement the method 100, the method 200, and/or the method 300. According to certain embodiments, the vehicle system 502 includes a vehicle 510 and a client device 512 associated with the vehicle 510. For example, the client device 512 is an on-board computer embedded or located in the vehicle 510. As an example, the client device 512 is a mobile device (e.g., a smartphone) that is connected (e.g., via wired or wireless links) to the vehicle 510. As an example, the client device 512 includes a processor 516 (e.g., a central processing unit (CPU), a graphics processing unit (GPU)), a memory 518 (e.g., random-access memory (RAM), read-only memory (ROM), flash memory), a communications unit 520 (e.g., a network transceiver), a display unit 522 (e.g., a touchscreen), and one or more sensors 524 (e.g., an accelerometer, a gyroscope, a magnetometer, a barometer, a GPS sensor). In certain embodiments, the client device 512 represents the on-board computer in the vehicle 510 and the mobile device connected to the vehicle 510. For example, the one or more sensors 524 may be in the vehicle 510 and in the mobile device connected to the vehicle 510.

In some embodiments, the vehicle 510 is operated by a real-world user, such as the first real-world user and/or the second real-world user. In certain embodiments, multiple vehicles 510 exist in the system 500 which are operated by respective users. For example, the first real-world user operates the first real-world vehicle and the second real-world user operates the second real-world vehicle.

In various embodiments, during vehicle trips, the one or more sensors 524 monitor the vehicle 510 by collecting data associated with various operating parameters of the vehicle, such as speed, acceleration, braking, location, engine status, fuel level, as well as other suitable parameters. In certain embodiments, the collected data include vehicle telematics data. According to some embodiments, the data are collected continuously, at predetermined time intervals, and/or based on a triggering event (e.g., when each sensor has acquired a threshold amount of sensor measurements). In various embodiments, the collected data represent the first real-world telematics data and/or the second real-world telematics data in the method 100, the method 200, and/or the method 300.

According to certain embodiments, the collected data are stored in the memory 518 before being transmitted to the server 506 using the communications unit 520 via the network 504 (e.g., via a local area network (LAN), a wide area network (WAN), the Internet). In some embodiments, the collected data are transmitted directly to the server 506 via the network 504. For example, the collected data are transmitted to the server 506 without being stored in the memory 518. In certain embodiments, the collected data are transmitted to the server 506 via a third party. For example, a data monitoring system stores any and all data collected by the one or more sensors 524 and transmits those data to the server 506 via the network 504 or a different network.

According to some embodiments, the server 506 includes a processor 530 (e.g., a microprocessor, a microcontroller), a memory 532, a communications unit 534 (e.g., a network transceiver), and a data storage 536 (e.g., one or more databases). In some embodiments, the server 506 is a single server, while in certain embodiments, the server 506 includes a plurality of servers with distributed processing. In FIG. 5, the data storage 536 is shown to be part of the server 506. In certain embodiments, the data storage 536 is a separate entity coupled to the server 506 via a network such as the network 504. In some embodiments, the server 506 includes various software applications stored in the memory 532 and executable by the processor 530. For example, these software applications include specific programs, routines, or scripts for performing functions associated with the method 100, the method 200, and/or the method 300. As an example, the software applications include general-purpose software applications for data processing, network communication, database management, web server operation, and/or other functions typically performed by a server.

According to various embodiments, the server 506 receives, via the network 504, the data collected by the one or more sensors 524 using the communications unit 534 and stores the data in the data storage 536. For example, the server 506 then processes the data to perform one or more processes of the method 100, one or more processes of the method 200, and/or one or more processes of the method 300.

According to certain embodiments, any related information determined or generated by the method 100, the method 200, and/or the method 300 (e.g., real-world driving characteristics, virtual experiences, virtual characters, virtual obstacles, etc.) are transmitted back to the client device 512, via the network 504, to be provided (e.g., displayed) to the user via the display unit 522.

In some embodiments, one or more processes of the method 100, one or more processes of the method 200, and/or one or more processes of the method 300 are performed by the client device 512. For example, the processor 516 of the client device 512 processes the data collected by the one or more sensors 524 to perform one or more processes of the method 100, one or more processes of the method 200, and/or one or more processes of the method 300.

III. ONE OR MORE COMPUTING DEVICES FOR GENERATING VIRTUAL EXPERIENCES ACCORDING TO CERTAIN EMBODIMENTS

Figure 6:
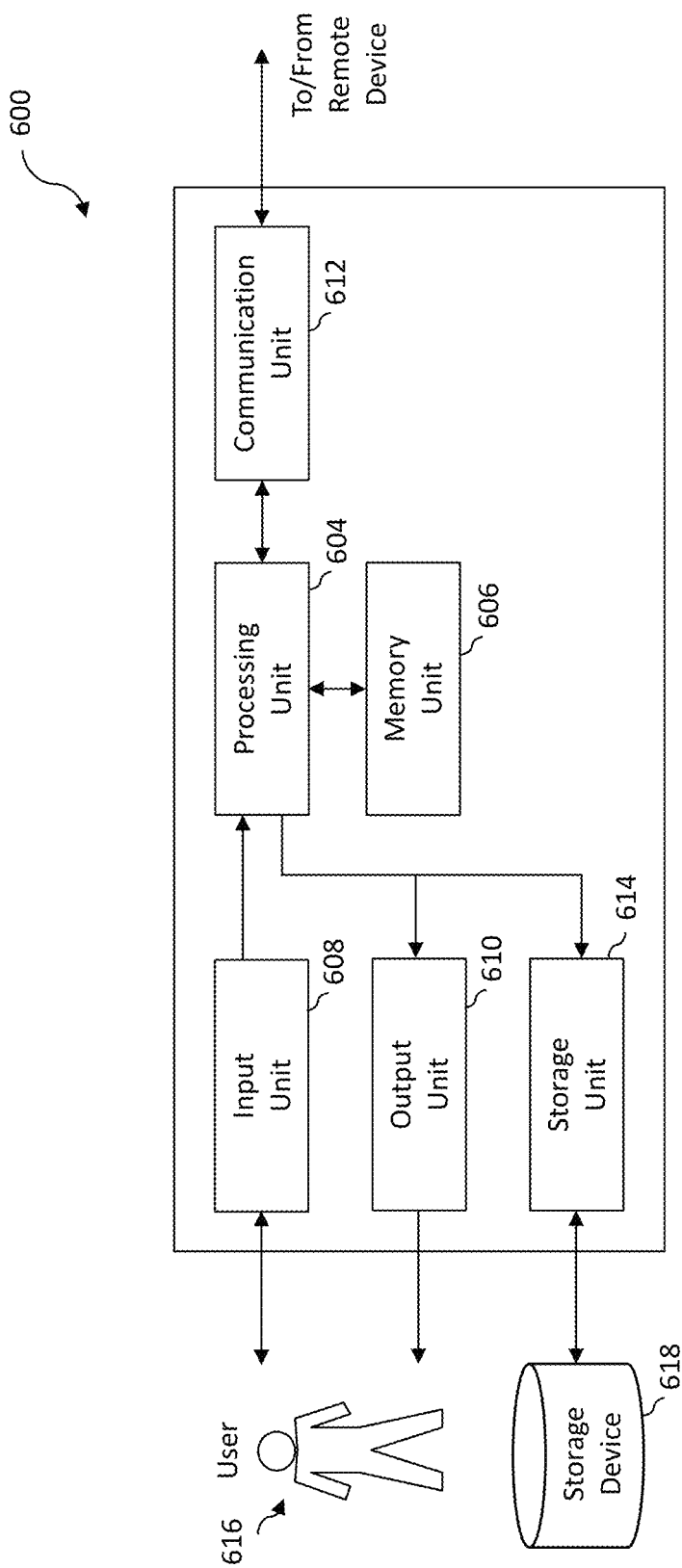
FIG. 6 shows a simplified computing device for generating virtual experiences according to certain embodiments of the present disclosure.

FIG. 6 shows a simplified computing device for generating virtual experiences according to certain embodiments of the present disclosure. This figure is merely an example, which should not unduly limit the scope of the claims. One of ordinary skill in the art would recognize many variations, alternatives, and modifications. The computing device 600 includes a processing unit 604, a memory unit 606, an input unit 608, an output unit 610, a communication unit 612, and a storage unit 614. In various embodiments, the computing device 600 is configured to be in communication with a user 616 and/or a storage device 618. In certain embodiments, the computing device 600 includes the client device 512 and/or the server 506 of FIG. 5. In some embodiments, the computing device 600 is configured to implement the method 100 of FIG. 1, the method 200 of FIG. 2A and/or FIG. 2B, and/or the method 300 of FIG. 3A and/or FIG. 3B. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 604 is configured for executing instructions, such as instructions to implement the method 100 of FIG. 1, the method 200 of FIG. 2A and/or FIG. 2B, and/or the method 300 of FIG. 3A and/or FIG. 3B. In some embodiments, the executable instructions are stored in the memory unit 606. In certain embodiments, the processing unit 604 includes one or more processing units (e.g., in a multi-core configuration). In some embodiments, the processing unit 604 includes and/or is communicatively coupled to one or more modules for implementing the methods and systems described in the present disclosure. In certain embodiments, the processing unit 604 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 606 includes a device allowing information, such as executable instructions and/or other data to be stored and retrieved. In some embodiments, the memory unit 606 includes one or more computer readable media. In certain embodiments, the memory unit 606 includes computer readable instructions for providing a user interface, such as to the user 616, via the output unit 610. In some embodiments, a user interface includes a web browser and/or a client application. For example, a web browser enables the user 616 to interact with media and/or other information embedded on a web page and/or a website. In certain embodiments, the memory unit 606 includes computer readable instructions for receiving and processing an input via the input unit 608. In some embodiments, the memory unit 606 includes RAM such as dynamic RAM (DRAM) or static RAM (SRAM), ROM, erasable programmable read-only memory (EPROM), electrically erasable programmable read-only memory (EEPROM), and/or non-volatile RAM (NVRAM).

In various embodiments, the input unit 608 is configured to receive input (e.g., from the user 616). In some embodiments, the input unit 608 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 608 is configured to function as both an input unit and an output unit.

In various embodiments, the output unit 610 includes a media output unit configured to present information to the user 616. In some embodiments, the output unit 610 includes any component capable of conveying information to the user 616. In certain embodiments, the output unit 610 includes an output adapter such as a video adapter and/or an audio adapter. For example, the output unit 610 is operatively coupled to the processing unit 604 and/or a visual display device to present information to the user 616 (e.g., a liquid crystal display (LCD), a light emitting diode (LED) display, an organic light emitting diode (OLED) display, a cathode ray tube (CRT) display, a projected display, etc.). As an example, the output unit 610 is operatively coupled to the processing unit 604 and/or an audio display device to present information to the user 616 (e.g., a speaker arrangement or headphones).

In various embodiments, the communication unit 612 is configured to be communicatively coupled to a remote device. In some embodiments, the communication unit 612 includes a wired network adapter, a wireless network adapter, a wireless data transceiver for use with a mobile phone network (e.g., 3G, 4G, 5G, Bluetooth, near-field communication (NFC), etc.), and/or other mobile data networks. In certain embodiments, other types of short-range or long-range networks may be used. In some embodiments, the communication unit 612 is configured to provide email integration for communicating data between a server and one or more clients.

In various embodiments, the storage unit 614 is configured to enable communication between the computing device 600 and the storage device 618. In some embodiments, the storage unit 614 is a storage interface. For example, the storage interface is any component capable of providing the processing unit 604 with access to the storage device 618. In certain embodiments, the storage unit 614 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 604 with access to the storage device 618.

In various embodiments, the storage device 618 includes any computer-operated hardware suitable for storing and/or retrieving data. In certain embodiments, the storage device 618 is integrated in the computing device 600. In some embodiments, the storage device 618 includes a database such as a local database or a cloud database. In certain embodiments, the storage device 618 includes one or more hard disk drives. In some embodiments, the storage device 618 is external and is configured to be accessed by a plurality of server systems. In certain embodiments, the storage device 618 includes multiple storage units such as hard disks or solid state disks in a redundant array of inexpensive disks configuration. In some embodiments, the storage device 618 includes a storage area network and/or a network attached storage system.

IV. EXAMPLES OF CERTAIN EMBODIMENTS OF THE PRESENT DISCLOSURE

According to certain embodiments, a method for generating one or more virtual experiences includes receiving first real-world telematics data associated with one or more prior first real-world vehicle trips made by a first real-world user. Also, the method includes determining one or more first real-world driving characteristics based at least in part upon the first real-world telematics data before one or more first virtual experiences are generated. Additionally, the method includes generating the one or more first virtual experiences based at least in part upon the one or more first real-world driving characteristics, where the one or more first virtual experiences are related to a first virtual character associated with the first real-world user. After the one or more first virtual experiences are generated, the method includes presenting the one or more first virtual experiences in a virtual game. Further, the method includes receiving second real-world telematics data associated with one or more prior second real-world vehicle trips made by a second real-world user. Also, the method includes determining one or more second real-world driving characteristics based at least in part upon the second real-world telematics data before one or more second virtual experiences are generated. Additionally, the method includes generating the one or more second virtual experiences based at least in part upon the one or more second real-world driving characteristics, where the one or more second virtual experiences are related to a second virtual character associated with the second real-world user. After the one or more second virtual experiences are generated, the method includes presenting the one or more second virtual experiences in the virtual game. The one or more first real-world driving characteristics and the one or more second real-world driving characteristics are different. The one or more first virtual experiences and the one or more second virtual experiences are generated to be different in response to the one or more first real-world driving characteristics and the one or more second real-world driving characteristics being different. For example, the method is implemented according to at least FIG. 1, FIG. 2A, FIG. 2B, FIG. 3A, and/or FIG. 3B.

According to some embodiments, a computing device for generating one or more virtual experiences includes one or more processors and a memory that stores instructions for execution by the one or more processors. The instructions, when executed, cause the one or more processors receive first real-world telematics data associated with one or more prior first real-world vehicle trips made by a first real-world user. Also, the instructions, when executed, cause the one or more processors to determine one or more first real-world driving characteristics based at least in part upon the first real-world telematics data before one or more first virtual experiences are generated. Additionally, the instructions, when executed, cause the one or more processors to generate the one or more first virtual experiences based at least in part upon the one or more first real-world driving characteristics, where the one or more first virtual experiences are related to a first virtual character associated with the first real-world user. After the one or more first virtual experiences are generated, the instructions, when executed, cause the one or more processors to present the one or more first virtual experiences in a virtual game. Further, the instructions, when executed, cause the one or more processors to receive second real-world telematics data associated with one or more prior second real-world vehicle trips made by a second real-world user. Also, the instructions, when executed, cause the one or more processors to determine one or more second real-world driving characteristics based at least in part upon the second real-world telematics data before one or more second virtual experiences are generated. Additionally, the instructions, when executed, cause the one or more processors to generate the one or more second virtual experiences based at least in part upon the one or more second real-world driving characteristics, where the one or more second virtual experiences are related to a second virtual character associated with the second real-world user. After the one or more second virtual experiences are generated, the instructions, when executed, cause the one or more processors to present the one or more second virtual experiences in the virtual game. The one or more first real-world driving characteristics and the one or more second real-world driving characteristics are different. The one or more first virtual experiences and the one or more second virtual experiences are generated to be different in response to the one or more first real-world driving characteristics and the one or more second real-world driving characteristics being different. For example, the computing device is implemented according to at least FIG. 5 and/or FIG. 6.

According to certain embodiments, a non-transitory computer-readable medium stores instructions for generating one or more virtual experiences. The instructions are executed by one or more processors of a computing device. The non-transitory computer-readable medium includes instructions to receive first real-world telematics data associated with one or more prior first real-world vehicle trips made by a first real-world user. Also, the non-transitory computer-readable medium includes instructions to determine one or more first real-world driving characteristics based at least in part upon the first real-world telematics data before one or more first virtual experiences are generated.

Additionally, the non-transitory computer-readable medium includes instructions to generate the one or more first virtual experiences based at least in part upon the one or more first real-world driving characteristics, where the one or more first virtual experiences are related to a first virtual character associated with the first real-world user. After the one or more first virtual experiences are generated, the non-transitory computer-readable medium includes instructions to present the one or more first virtual experiences in a virtual game. Further, the non-transitory computer-readable medium includes instructions to receive second real-world telematics data associated with one or more prior second real-world vehicle trips made by a second real-world user. Also, the non-transitory computer-readable medium includes instructions to determine one or more second real-world driving characteristics based at least in part upon the second real-world telematics data before one or more second virtual experiences are generated. Additionally, the non-transitory computer-readable medium includes instructions to generate the one or more second virtual experiences based at least in part upon the one or more second real-world driving characteristics, where the one or more second virtual experiences are related to a second virtual character associated with the second real-world user. After the one or more second virtual experiences are generated, the non-transitory computer-readable medium includes instructions to present the one or more second virtual experiences in the virtual game. The one or more first real-world driving characteristics and the one or more second real-world driving characteristics are different. The one or more first virtual experiences and the one or more second virtual experiences are generated to be different in response to the one or more first real-world driving characteristics and the one or more second real-world driving characteristics being different. For example, the non-transitory computer-readable medium is implemented according to at least FIG. 1, FIG. 2A, FIG. 2B, FIG. 3A, FIG. 3B, FIG. 5, and/or FIG. 6.

V. EXAMPLES OF MACHINE LEARNING ACCORDING TO CERTAIN EMBODIMENTS

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VI. ADDITIONAL CONSIDERATIONS ACCORDING TO CERTAIN EMBODIMENTS

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A method for generating one or more virtual experiences, the method comprising:
   receiving, by a computing device, first real-world telematics data associated with one or more prior first real-world vehicle trips made by a first real-world user;
   determining, by the computing device, one or more first real-world driving behaviors of the first real-world user based at least in part upon the first real-world telematics data before one or more first virtual experiences are generated;
   generating, by the computing device, the one or more first virtual experiences based at least in part upon the one or more first real-world driving behaviors, the one or more first virtual experiences being related to a first virtual character associated with the first real-world user;
   after the one or more first virtual experiences are generated, presenting, by the computing device, the one or more first virtual experiences in a virtual game to the first real-world user, wherein the one or more first virtual experiences includes one or more first virtual obstacles to be encountered by the first virtual character in the virtual game based at least in part upon the one or more first real-world driving behaviors;
   receiving, by the computing device, second real-world telematics data associated with one or more prior second real-world vehicle trips made by a second real-world user;
   determining, by the computing device, one or more second real-world driving behaviors based at least in part upon the second real-world telematics data before one or more second virtual experiences are generated;
   generating, by the computing device, the one or more second virtual experiences based at least in part upon the one or more second real-world driving behaviors of the second real-world user, the one or more second virtual experiences being related to a second virtual character associated with the second real-world user; and
   after the one or more second virtual experiences are generated, presenting, by the computing device, the one or more second virtual experiences in the virtual game to the second real-world user, wherein the one or more second virtual experiences includes one or more second virtual obstacles to be encountered by the second virtual character in the virtual game based at least in part upon the one or more second real-world driving behaviors;
   wherein,
      the one or more first real-world driving behaviors and the one or more second real-world driving behaviors are different; and
      the one or more first virtual experiences and the one or more second virtual experiences are generated to be different in response to the one or more first real-world driving behaviors and the one or more second real-world driving behaviors being different.

2. The method of claim 1, further comprising:
   presenting, by the computing device, the first virtual character in the virtual game; and
   applying, by the computing device, the one or more first virtual experiences to the first virtual character in the virtual game.

3. The method of claim 2, further comprising:
   presenting, by the computing device, the second virtual character in the virtual game; and
   applying, by the computing device, the one or more second virtual experiences to the second virtual character in the virtual game.

4. The method of claim 3, further comprising:
   determining, by the computing device, one or more first virtual characteristics based at least in part upon the one or more first real-world driving behaviors; and
   generating, by the computing device, the first virtual character associated with the one or more first virtual characteristics before presenting the first virtual character in the virtual game.

5. The method of claim 4, further comprising:
   determining, by the computing device, one or more second virtual characteristics based at least in part upon the one or more second real-world driving behaviors; and
   generating, by the computing device, the second virtual character associated with the one or more second virtual characteristics before presenting the second virtual character in the virtual game.

6. The method of claim 5, wherein,
the one or more first virtual characteristics and the one or more second virtual characteristics are generated to be different in response to the one or more first real-world driving behaviors and the one or more second real-world driving behaviors being different; and
the first virtual character and the second virtual character are generated to be different with different virtual characteristics.

7. The method of claim 1, wherein, the generating, by the computing device, the one or more first virtual experiences based at least in part upon the one or more first real-world driving behaviors includes:
generating the one or more first virtual obstacles to be placed at corresponding one or more first virtual locations based at least in part upon the one or more first real-world driving behaviors.

8. The method of claim 7, wherein, the generating, by the computing device, the one or more second virtual experiences based at least in part upon the one or more second real-world driving behaviors includes:
generating the one or more second virtual obstacles to be placed at corresponding one or more second virtual locations based at least in part upon the one or more second real-world driving behaviors.

9. The method of claim 8, wherein, the one or more first virtual obstacles and the one or more second virtual obstacles are generated to be different in response to the one or more first real-world driving behaviors and the one or more second real-world driving behaviors being different.

10. The method of claim 9, wherein, the corresponding one or more first virtual locations and the corresponding one or more second virtual locations are different in response to the one or more first real-world driving behaviors and the one or more second real-world driving behaviors being different.

11. The method of claim 1, further comprising:
receiving, by the computing device, third real-world telematics data associated with one or more third real-world vehicle trips made by the first real-world user;
updating, by the computing device, the one or more first virtual experiences based at least in part upon the third real-world telematics data;
receiving, by the computing device, fourth real-world telematics data associated with one or more fourth real-world vehicle trips made by the second real-world user; and
updating, by the computing device, the one or more second virtual experiences based at least in part upon the fourth real-world telematics data.

12. A computing device for generating one or more virtual experiences, the computing device comprising:
one or more processors; and
a memory storing instructions that, when executed by the one or more processors, cause the one or more processors to:
receive first real-world telematics data associated with one or more prior first real-world vehicle trips made by a first real-world user;
determine one or more first real-world driving behaviors based at least in part upon the first real-world telematics data before one or more first virtual experiences are generated;
generate the one or more first virtual experiences based at least in part upon the one or more first real-world driving behaviors, the one or more first virtual experiences being related to a first virtual character associated with the first real-world user;
after the one or more first virtual experiences are generated, present the one or more first virtual experiences in a virtual game;
receive second real-world telematics data associated with one or more prior second real-world vehicle trips made by a second real-world user;
determine one or more second real-world driving behaviors based at least in part upon the second real-world telematics data before one or more second virtual experiences are generated;
generate the one or more second virtual experiences based at least in part upon the one or more second real-world driving behaviors, the one or more second virtual experiences being related to a second virtual character associated with the second real-world user; and
after the one or more second virtual experiences are generated, present the one or more second virtual experiences in the virtual game;
wherein,
the one or more first real-world driving behaviors and the one or more second real-world driving behaviors are different; and
the one or more first virtual experiences and the one or more second virtual experiences are generated to be different in response to the one or more first real-world driving behaviors and the one or more second real-world driving behaviors being different.

13. The computing device of claim 12, wherein, the instructions further comprise instructions that, when executed by the one or more processors, cause the one or more processors to:
present the first virtual character in the virtual game; and
apply the one or more first virtual experiences to the first virtual character in the virtual game.

14. The computing device of claim 13, wherein, the instructions further comprise instructions that, when executed by the one or more processors, cause the one or more processors to:
present the second virtual character in the virtual game; and
apply the one or more second virtual experiences to the second virtual character in the virtual game.

15. The computing device of claim 13, wherein, the instructions that cause the one or more processors to generate the one or more second virtual experiences based at least in part upon the one or more second real-world driving behaviors further comprise instructions that cause the one or more processors to:
generate one or more second virtual obstacles to be placed at corresponding one or more second virtual locations based at least in part upon the one or more second real-world driving behaviors.

16. The computing device of claim 12, wherein, the instructions that cause the one or more processors to generate the one or more first virtual experiences based at least in part upon the one or more first real-world driving behaviors further comprise instructions that cause the one or more processors to:
generate one or more first virtual obstacles to be placed at corresponding one or more first virtual locations based at least in part upon the one or more first real-world driving behaviors.

17. The computing device of claim 12, wherein, the instructions further comprise instructions that, when executed by the one or more processors, cause the one or more processors to:
  receive third real-world telematics data associated with one or more third real-world vehicle trips made by the first real-world user;
  update the one or more first virtual experiences based at least in part upon the third real-world telematics data;
  receive fourth real-world telematics data associated with one or more fourth real-world vehicle trips made by the second real-world user; and
  update the one or more second virtual experiences based at least in part upon the fourth real-world telematics data.

18. A non-transitory computer-readable medium storing instructions for generating one or more virtual experiences, the instructions when executed by one or more processors of a computing device, cause the computing device to:
  receive first real-world telematics data associated with one or more prior first real-world vehicle trips made by a first real-world user;
  determine one or more first real-world driving behaviors based at least in part upon the first real-world telematics data before one or more first virtual experiences are generated;
  generate the one or more first virtual experiences based at least in part upon the one or more first real-world driving behaviors, the one or more first virtual experiences being related to a first virtual character associated with the first real-world user;
  after the one or more first virtual experiences are generated, present the one or more first virtual experiences in a virtual game;
  receive second real-world telematics data associated with one or more prior second real-world vehicle trips made by a second real-world user;
  determine one or more second real-world driving behaviors based at least in part upon the second real-world telematics data before one or more second virtual experiences are generated;
  generate the one or more second virtual experiences based at least in part upon the one or more second real-world driving behaviors, the one or more second virtual experiences being related to a second virtual character associated with the second real-world user; and
  after the one or more second virtual experiences are generated, present the one or more second virtual experiences in the virtual game;
  wherein,
    the one or more first real-world driving behaviors and the one or more second real-world driving behaviors are different; and
    the one or more first virtual experiences and the one or more second virtual experiences are generated to be different in response to the one or more first real-world driving behaviors and the one or more second real-world driving behaviors being different.

19. The non-transitory computer-readable medium of claim 18, wherein, the instructions when executed by the one or more processors further cause the computing device to:
  present the first virtual character in the virtual game; and
  apply the one or more first virtual experiences to the first virtual character in the virtual game.

20. The non-transitory computer-readable medium of claim 19, wherein, the instructions when executed by the one or more processors further cause the computing device to:
  present the second virtual character in the virtual game; and
  apply the one or more second virtual experiences to the second virtual character in the virtual game.

* * * * *